US009361559B2

(12) United States Patent
Shibata

(10) Patent No.: US 9,361,559 B2
(45) Date of Patent: Jun. 7, 2016

(54) IMAGE PROCESSING DEVICE AND METHOD, PROGRAM, AND IMAGE FORMING DEVICE

(71) Applicant: FUJIFILM Corporation, Tokyo (JP)

(72) Inventor: Hiroyuki Shibata, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/745,125

(22) Filed: Jun. 19, 2015

(65) Prior Publication Data

US 2015/0286908 A1 Oct. 8, 2015

Related U.S. Application Data

(63) Continuation of application No. PCT/JP2014/050538, filed on Jan. 15, 2014.

(30) Foreign Application Priority Data

Jan. 30, 2013 (JP) ................................. 2013-015462

(51) Int. Cl.
G06K 15/00 (2006.01)
H04N 1/405 (2006.01)
G06K 15/02 (2006.01)
B41J 2/21 (2006.01)
H04N 1/52 (2006.01)

(52) U.S. Cl.
CPC ........... G06K 15/1881 (2013.01); B41J 2/2139 (2013.01); H04N 1/405 (2013.01); H04N 1/52 (2013.01)

(58) Field of Classification Search
None
See application file for complete search history.

(56) References Cited

U.S. PATENT DOCUMENTS

2012/0114188 A1* 5/2012 Murase .............. H04N 1/00015
382/112
2012/0229549 A1* 9/2012 Shibata ................ B41J 2/04508
347/15

FOREIGN PATENT DOCUMENTS

JP 4143560 B2 9/2008
JP 4614076 B2 1/2011
JP 4670696 B2 4/2011

OTHER PUBLICATIONS

International Search Report; PCT/JP2014/050538; Apr. 15, 2014.
Written Opinion of the International Searching Authority; PCT/JP2014/050538; Apr. 15, 2014.

* cited by examiner

Primary Examiner — Vincent Rudolph
Assistant Examiner — Michael Burleson
(74) Attorney, Agent, or Firm — Studebaker & Brackett PC

(57) ABSTRACT

An image processing method corrects the image concentration of pixel rows adjacent to a pixel row corresponding to a masked defective recording element. Different quantization methods are performed for a first image region including the pixel row corresponding to the masked defective recording element and the pixel rows adjacent to the pixel row and a second image region other than the first image region. For at least some gradations, a first quantization pattern which is obtained by the first quantization method applied to the first image region has a pattern characteristic in which a spatial frequency component in a first direction parallel to the moving direction of a recording medium relative to the recording head is suppressed with respect to all spatial frequency components in a second direction perpendicular to the first direction, as compared to a second quantization pattern applied to the second image region.

16 Claims, 33 Drawing Sheets

SHEET TRANSPORTATION DIRECTION

SHEET TRANSPORTATION DIRECTION

FIG. 17

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 |
| 0 | 0 | 0 | 0 | 0 | 0 | 1 | 6 | 1 | 0 | 0 | 0 | 0 | 0 | 0 |
| 0 | 0 | 0 | 0 | 0 | 1 | 5 | 10 | 5 | 1 | 0 | 0 | 0 | 0 | 0 |
| 0 | 0 | 0 | 0 | 1 | 2 | 9 | 999 | 9 | 2 | 1 | 0 | 0 | 0 | 0 |
| 0 | 0 | 0 | 0 | 0 | 1 | 5 | 10 | 5 | 1 | 0 | 0 | 0 | 0 | 0 |
| 0 | 0 | 0 | 0 | 0 | 0 | 1 | 6 | 1 | 0 | 0 | 0 | 0 | 0 | 0 |
| 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

TRANSPORTATION DIRECTION →

SHEET TRANSPORTATION DIRECTION

FIG. 20A

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 |
| 0 | 0 | 0 | 0 | 0 | 0 | 1 | 5 | 1 | 0 | 0 | 0 | 0 | 0 | 0 |
| 0 | 0 | 0 | 0 | 0 | 1 | 5 | 10 | 5 | 1 | 0 | 0 | 0 | 0 | 0 |
| 0 | 0 | 0 | 0 | 1 | 5 | 10 | 999 | 10 | 5 | 1 | 0 | 0 | 0 | 0 |
| 0 | 0 | 0 | 0 | 0 | 1 | 5 | 10 | 5 | 1 | 0 | 0 | 0 | 0 | 0 |
| 0 | 0 | 0 | 0 | 0 | 0 | 1 | 5 | 1 | 0 | 0 | 0 | 0 | 0 | 0 |
| 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

TRANSPORTATION DIRECTION →

FIG. 20B

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 999 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

TRANSPORTATION DIRECTION →

ORDER OF ERROR DIFFUSION PROCESS

SHEET TRANSPORTATION DIRECTION

A: COMPONENT IN HORIZONTAL DIRECTION
IN ERROR DIFFUSION MATRIX

IMAGE PROCESSING DEVICE AND METHOD, PROGRAM, AND IMAGE FORMING DEVICE

CROSS-REFERENCE TO RELATED APPLICATIONS

This application is a Continuation of PCT International Application No. PCT/JP2014/50538, filed on Jan. 15, 2014, which claims priority under 35 U.S.C. §119(a) to Japanese Patent Application No. 2013-015462, filed on Jan. 30, 2013. Each of the above application(s) is hereby expressly incorporated by reference, in its entirety, into the present application.

BACKGROUND OF THE INVENTION

1. Field of the Invention

The present invention relates to an image processing device and method, a non-transitory computer readable medium storing a program, and an image forming device, and more particularly, to a digital halftoning technique for representing gradations using the recording of dots by an inkjet recording device.

2. Description of the Related Art

An inkjet recording device which is one of image forming devices moves a sheet (recording medium) and a recording head in which a plurality of ink discharge holes (nozzles) are arranged relative to each other and discharges ink droplets from the nozzles to form a desired image on the sheet. A two-dimensional nozzle array head that improves recording resolution using a nozzle layout in which a plurality of nozzles are two-dimensionally arranged is used as a recording head in order to output a high-definition image.

In addition, a single pass system having the following structure has been known: an elongated line head having a nozzle array that covers the entire drawing region in the width direction of the sheet (hereinafter, referred to as a "direction perpendicular to a sheet transportation direction" or an "x direction") perpendicular to the transportation direction of the sheet (hereinafter, referred to as a "sheet transportation direction" or a "y direction") is used in order to improve print productivity; and a recording medium is moved relative to the line head only once to form an image with predetermined resolution on the recording medium (JP4670696B, JP4614076B, and JP4143560B).

SUMMARY OF THE INVENTION

In the single-pass-type inkjet recording device, in some cases, streak-like unevenness (streak unevenness) occurs in the sheet transportation direction due to a discharge failure, such as a discharge in an incorrect direction or non-discharge. In order to solve this problem, image correction is performed which masks an abnormal nozzle so as not to be used to discharge droplets and increases the printing concentration of recording positions on both sides of the pixel to be recorded by the abnormal nozzle to reduce the visibility of streaks. The image correction is referred to, for example, as "unevenness correction" or "concentration correction". In the specification, this process is referred to as concentration correction.

FIG. 32 is a conceptual diagram illustrating the concentration correction. In FIG. 32, reference numeral 500 indicates a nozzle row of the line head and reference numeral 510-$i$ ($i$=1, 2, ..., 17) indicates nozzles which are arranged in the x direction. In FIG. 32, the nozzle represented by reference numeral 510-5 and the nozzle represented by reference numeral 510-15 are abnormal discharge nozzles and these nozzles are masked so as not to be used for recording and are treated as non-discharging nozzles.

FIG. 32 illustrates a uniform concentration image in which an input gradation value is constant at pixel positions corresponding to each nozzle as an image (reference numeral 520) before the concentration correction.

Reference numeral 530 illustrated on the lower side of FIG. 32 indicates an image after the concentration correction. Non-discharging nozzles 510-5 and 510-15 are masked and pixel rows corresponding to pixel positions 540-5 and 540-15 corresponding to the non-discharging nozzles 510-5 and 510-15 are not recorded. For pixel rows at the positions of pixels (540-4 and 540-6, and 540-14 and 540-16) adjacent on the left and right sides of the pixel rows, signal values are corrected so as to increase image concentration. Therefore, in the concentration-corrected image 530, the image concentration of the pixel rows (at the positions represented by reference numerals 540-4, 540-6, 540-14, and 540-16) which are adjacent on the left and right sides of the pixel positions 540-5 and 540-15 corresponding to the non-discharging nozzles is high.

Halftone processing (quantization process), such as a dither method or an error diffusion method, is performed for the concentration-corrected image 530 to convert the image into binary or multi-valued dot data and discharge control is performed for each nozzle on the basis of the dot data.

However, as such, when a specific nozzle is masked, the halftone shape of the masked portion is broken, which causes deterioration of image quality, such as a reduction in granularity or the generation of an artifact (a virtual image or a false image). This can be understood as "BEAT" which is caused by raster-shaped frequency characteristics and frequency characteristics of a quantization pattern due to masking done without concentration correction.

BEAT is to generate a beat corresponding to the original frequency difference when waves with adjacent frequencies overlap each other. For example, when a wave with a frequency $f_1$ and a wave with a frequency $f_2$ overlap each other, a beat with a frequency $|f_1-f_2|$ is generated. When the frequencies $f_1$ and $f_2$ are close to each other, the frequency of the beat is close to 0. As a result, a low-frequency beat is generated.

As represented by reference numeral 530 in FIG. 32, since the quantization process is performed for an image after raster-shaped concentration correction parallel to a scanning line (raster) along the sheet transportation direction, similarly, BEAT phenomenon occurs in a spatial frequency component of the quantization pattern and a spatial frequency component of the concentration-corrected image. That is, when the quantization pattern and the image after raster-shaped concentration correction have adjacent frequency components, a low-frequency beat corresponding to the difference between the frequency components is generated. As a result, the low-frequency beat causes a reduction in granularity or is seen as an artifact. When a general quantization process according to the related art is applied to the image after raster-shaped concentration correction, generally, the above-mentioned problems arise.

FIG. 33 is a diagram schematically illustrating the frequency characteristics of a general quantization pattern. The horizontal axis indicates a spatial frequency in the sheet transportation direction (raster direction) and the vertical axis indicates a spatial frequency in a direction perpendicular to the sheet transportation direction (hereinafter, referred to as a direction perpendicular to a sheet transportation direction). In FIG. 33, a frequency component is represented by shading. In FIG. 33, a gray portion 550 indicates the frequency characteristics of the general quantization pattern.

The human eye has visual characteristics which are substantially isotropic and in which the eye is less likely to see an image as the frequency increases. Therefore, as represented by the gray portion 550 of FIG. 33, when a pattern is generated such that no component is arranged in a low frequency region (a white portion in FIG. 33) and components are isotropically arranged in a high-frequency region, it is possible to represent a halftone such that a dot pattern is hardly seen. The general halftone processing according to the related art generates a quantization pattern having the above-mentioned frequency characteristics (FIG. 33).

Next, concentration correction is considered. As described with reference to FIG. 32, in the concentration correction, image data of the image 520 before correction is converted into an image (image 530 after concentration correction) with a striped concentration distribution parallel to the sheet transportation direction.

When the image is represented by a frequency space illustrated in FIG. 33, the image before correction has a frequency component in a region which is surrounded by a dashed circle represented by reference numeral 560. That is, when raster-shaped concentration correction is not performed (before correction), a halftone input image component is in the range surrounded by the dashed circle 560.

In contrast, the image (reference numeral 530) after raster-shaped concentration correction has uniform concentration in the sheet transportation direction. Therefore, the peak of the frequency component occurs at any position where the frequency component in the sheet transportation direction is certainly "0".

The direction perpendicular to the sheet transportation direction depends on the state of the unevenness of the read image (streak unevenness and concentration unevenness are referred to as "unevenness") and the frequency characteristics of the image are random or depend on a device. In the raster-shaped concentration correction, the peak of the component occurs by any position in the region (a region in the vicinity of a frequency ky=0 (vertical) in the sheet transportation direction) represented by reference numeral 564 in FIG. 33.

As can be seen from the above, the gray portion 550 illustrated in FIG. 33 has components in the quantization pattern obtained by the general quantization process and the region represented by reference numeral 564 has components in the image subjected to the raster-shaped concentration correction. Therefore, in an overlapping region between the quantization pattern and the image, that is, a region which is surrounded by a one-dot chain line represented by reference numeral 568 in FIG. 33, both the image after the raster-shaped concentration correction and the quantization pattern have components.

When the raster-shaped concentration correction is not performed (reference numeral 560), there is no component close to the component (gray portion 550) of the quantization pattern and BEAT which can be seen by the eye is not generated. In contrast, when the raster-shaped concentration correction is performed, adjacent components (the region surrounded by a one-dot chain line represented by reference numeral 568) are generated. Since the frequency bands thereof are close to each other, a low-frequency beat is generated due to interference. That is, an artifact is generated by a combination of the raster-shaped concentration correction and the general quantization pattern.

JP4670696B, JP4614076B, and JP4143560B disclose the problem that granularity is reduced when concentration correction is performed, but do not sufficiently respond to the above-mentioned problem (beat caused by BEAT).

JP4670696B discloses a technique which changes the value of a threshold matrix on the basis of the characteristics of each nozzle to correct the concentration of a streak portion (which corresponds to the "raster-shaped concentration correction" in the specification) and replaces threshold values in the same row to suppress a reduction in granularity. This method is likely to suppress the reduction in granularity only in the same row (sheet transportation direction), but is not capable of responding to the reduction in granularity when a streak occurs at any position in the direction perpendicular to the sheet transportation direction and concentration correction is performed. In particular, when streak unevenness has a high frequency or is random or when non-discharge occurs densely, a raster correction component is generated in the region represented by reference numeral 568 in FIG. 33. In this case, the beat caused by the quantization pattern and the raster-shaped concentration correction is also generated in the direction perpendicular to the sheet transportation direction. However, since threshold matrix replacement correction is performed only in the sheet transportation direction, it is difficult to remove an artifact in the direction perpendicular to the sheet transportation direction.

JP4614076B discloses a pattern generation method which optimizes a dot array while evaluating the degree of reduction in image quality when a nozzle defect (non-discharging nozzle) occurs and prevents the generation of an artifact due to the nozzle defect. The dot array obtained by the optimization makes it possible to obtain an excellent result from the above-mentioned problems.

However, the dot array obtained through the optimization in JP4614076B is optimized only for the expected nozzle defect. Therefore, when streak unevenness occurs in an arbitrary cycle, the optimization does not ensure that no artifact is generated. In JP4614076B, since pattern optimization is basically performed for an isotropic granular evaluation value and an anisotropic evaluation value, the optimized quantization pattern tends to have the frequency characteristics of the general quantization pattern illustrated in FIG. 33. Therefore, a few components in the region represented by reference numeral 568 in FIG. 33 remain, which makes it difficult to completely suppress the artifact caused by BEAT, which is the problem to be solved.

JP4143560B discloses a threshold matrix in which a frequency component in at least the main scanning direction (which corresponds to the "direction perpendicular to the sheet transportation direction" in the specification) in a dot pattern is weak. In JP4143560B, problems unique to streak unevenness correction are not considered. The use of the threshold matrix makes it possible to suppress the generation of an artifact due to a nozzle defect.

However, in a case in which a threshold matrix having frequency characteristics in which the generation of the artifact is suppressed at all gradations is generated, when the threshold matrix is used in a normal region in which a nozzle defect does not occur, granularity is significantly reduced particularly in a region with a small number of dots. The reason is that, in the region with a small number of dots, granularity is high in a pattern with isotropic frequency characteristics. That is, in the method disclosed in JP4143560B, it is difficult to achieve the suppression of the artifact caused by a nozzle defect and the suppression of the reduction in granularity.

The above-mentioned problems are not limited to the inkjet recording device, but are common to image forming devices which record dots to represent gradations.

The invention has been made in view of the above-mentioned problems and an object of the invention is to provide an image processing method and device, a non-transitory computer readable medium storing a program, and an image forming device that can generate a high-quality image, without generating an artifact or reducing granularity, even when a large number of uneven streaks or non-discharging nozzles (defective recording elements) occur with an arbitrary spatial period or even when they do not occur.

In order to solve the above-mentioned problems, the following aspects of the invention are provided.

(First Aspect): An image processing method includes: a defect information acquisition step of acquiring information about a defective recording element in a recording head in which a plurality of recording elements are arranged; a mask processing step of performing a mask process that makes the defective recording element unusable on the basis of the defective recording element information acquired in the defect information acquisition step; an image correction step of correcting image concentration of pixel rows, which are adjacent to a pixel row corresponding to the masked defective recording element, in input image data to reduce visibility of a streak-like image defect caused by the mask process; and a quantization processing step of quantizing the image data whose concentration has been corrected in the image correction step to convert the image data into binary or multi-valued image data with a smaller number of gradations than the concentration-corrected image data. The quantization processing step includes: a first quantization step of applying a first quantization method to a first image region which includes the pixel row corresponding to the masked defective recording element and the pixel rows adjacent to the pixel row corresponding to the defective recording element to perform quantization; and a second quantization step of applying a second quantization method different from the first quantization method to a second image region other than the first image region to perform quantization. For at least some gradations, a first quantization pattern which is obtained by quantization using the first quantization method has a first pattern characteristic in which a spatial frequency component in a first direction parallel to a moving direction of a recording medium relative to the recording head is suppressed with respect to all spatial frequency components in a second direction perpendicular to the first direction, as compared to a second quantization pattern which is obtained by quantization using the second quantization method.

According to the first aspect, the image concentration of the pixel rows which are adjacent to the pixel row corresponding to the masked defective recording element is corrected and different quantization methods are performed for the first image region (a region in the vicinity of the defective recording element) which includes the pixel row corresponding to the masked defective recording element and the pixel rows adjacent to the pixel row and the second image region (normal region) other than the first image region. For at least some gradations, the first quantization method applied to the first image region generates the quantization pattern in which a low-frequency component of a spatial frequency in a direction (first direction) parallel to the moving direction of the recording medium relative to the recording head is suppressed, as compared to the second quantization method applied to the second image region. Therefore, even when a plurality of defective recording elements occur, it is possible to suppress the generation of an artifact between a plurality of first image regions.

In the quantization of the first image region, the first pattern characteristic in which the low-frequency component in the first direction is suppressed is maintained in a wide gradation region, as compared to the quantization of the second image region. Therefore, it is possible to suppress the generation of an artifact due to the correction of image concentration. In addition, since the second image region can have a dot array with the second pattern characteristic different from the first pattern characteristic, it is possible to avoid a reduction in granularity in the second image region.

(Second Aspect): In the image processing method according to the first aspect, a common quantization pattern may be obtained for a reference specific halftone by the first quantization method and the second quantization method. In a second gradation region different from a first gradation region including the specific halftone, the second quantization method may generate a quantization pattern indicating a second pattern characteristic different from the first pattern characteristic and the first quantization method may generate a quantization pattern which maintains the first pattern characteristic, as compared to the second quantization method.

According to the second aspect, the quantization method is determined on the basis of the common quantization pattern. Therefore, for a specific gradation (reference halftone) corresponding to the common pattern, the pattern after quantization is maintained between the first image region and the second image region since the common pattern is obtained (the characteristics of the common quantization pattern are maintained in both the first image region and the second image region at other gradations generated on the basis of the reference). Therefore, it is possible to suppress the generation of an artifact caused by discontinuity between two image regions when different quantization methods are applied.

(Third Aspect): In the image processing method according to the second aspect, the common quantization pattern may have the first pattern characteristic.

According to the third aspect, since the first pattern characteristic is applied to the common quantization pattern as the reference, the first pattern characteristic is maintained in a wide gradation region. Therefore, it is possible to suppress the generation of an artifact due to the correction of image concentration in a wide gradation region.

(Fourth Aspect): In the image processing method according to the second or third aspect, in the quantization processing step, different threshold matrices may be applied to the first image region and the second image region to perform the quantization. A first threshold matrix which is applied to the first image region in the first quantization step and a second threshold matrix which is applied to the second image region in the second quantization step may be generated on the basis of the common quantization pattern. In the first threshold matrix, the first pattern characteristic may be maintained at a larger number of gradations than that in the second threshold matrix.

(Fifth Aspect): In the image processing method according to the fourth aspect, the quantization processing step may include a step of diffusing a quantization error, which occurs due to quantization using the first threshold matrix or the second threshold matrix, to neighboring pixels that have not been quantized.

(Sixth Aspect): In the image processing method according to the second or third aspect, the first quantization method and the second quantization method may perform the quantization using the common threshold matrix. In the common threshold matrix, the first pattern characteristic may be maintained in the first gradation region and the second gradation region. In the first image region, the quantization may be performed with reference to the common threshold matrix in the first gradation region and the second gradation region. In the second image region, the quantization may be performed with reference to the common threshold matrix in the first gradation region and may be performed in the second gradation region by an error diffusion method which uses, as a constraint condition of a dot array, the common quantization pattern or a threshold matrix pattern of gradations close to the common quantization pattern.

(Seventh Aspect): In the image processing method according to any one of the first to sixth aspects, in the first pattern characteristic, a low-frequency component that is equal to or less than 10 cycles/mm among the spatial frequency components in the first direction may be suppressed.

(Eighth Aspect): In the image processing method according to the seventh aspect, in the first pattern characteristic, it is preferable that a component has a minimum value in a region corresponding to the low-frequency component that is equal to or less than 10 cycles/mm among the spatial frequency components in the first direction, when a distribution of a spatial frequency spectrum obtained by two-dimensional Fourier transform is seen from a section line parallel to the first direction.

(Ninth Aspect): An image processing device includes: a defect information acquisition unit acquiring information about a defective recording element in a recording head in which a plurality of recording elements are arranged; a mask processing unit performing a mask process that makes the defective recording element unusable on the basis of the defective recording element information acquired by the defect information acquisition unit; an image correction unit correcting image concentration of pixel rows, which are adjacent to a pixel row corresponding to the masked defective recording element, in input image data to reduce visibility of a streak-like image defect caused by the mask process; and a quantization processing unit for quantizing the image data whose concentration has been corrected by the image correction unit to convert the image data into binary or multi-valued image data with a smaller number of gradations than the concentration-corrected image data. The quantization processing unit includes: a first quantization unit for applying a first quantization method to a first image region which includes the pixel row corresponding to the masked defective recording element and the pixel rows adjacent to the pixel row to perform quantization; and a second quantization unit for applying a second quantization method different from the first quantization method to a second image region other than the first image region to perform quantization. For at least some gradations, a first quantization pattern which is obtained by quantization using the first quantization method has a first pattern characteristic in which a spatial frequency component in a first direction parallel to a moving direction of a recording medium relative to the recording head is suppressed with respect to all spatial frequency components in a second direction perpendicular to the first direction, as compared to a second quantization pattern which is obtained by quantization using the second quantization method.

(Tenth Aspect): In the image processing device according to the ninth aspect, a common quantization pattern may be obtained for a reference specific halftone by the first quantization method and the second quantization method. In a second gradation region different from a first gradation region including the specific halftone, the second quantization method may generate a quantization pattern indicating a second pattern characteristic different from the first pattern characteristic and the first quantization method may generate a quantization pattern which maintains the first pattern characteristic, as compared to the second quantization method.

(Eleventh Aspect): In the image processing device according to the tenth aspect, the common quantization pattern may have the first pattern characteristic.

In the image processing device according to the ninth to eleventh aspects, the same specified matters as those described in the second to sixth aspects may be appropriately combined with each other. In this case, the matter specified as the "step" is specified as "unit" corresponding to the step.

(Twelfth Aspect): In the image processing device according to the tenth or eleventh aspect, the quantization processing unit may apply different threshold matrices to the first image region and the second image region to perform the quantization. The first quantization unit may generate a first threshold matrix which is applied to the first image region on the basis of the common quantization pattern. The second quantization unit may generate a second threshold matrix which is applied to the second image region on the basis of the common quantization pattern. In the first threshold matrix, the first pattern characteristic may be maintained at a larger number of gradations than that in the second threshold matrix.

(Thirteenth Aspect): In the image processing device according to the twelfth aspect, the quantization processing unit may diffuse a quantization error, which occurs due to quantization using the first threshold matrix or the second threshold matrix, to neighboring pixels that have not been quantized.

(Fourteenth Aspect): In the image processing device according to the eleventh aspect, the first quantization method and the second quantization method may perform the quantization using the common threshold matrix. In the common threshold matrix, the first pattern characteristic may be maintained in the first gradation region and the second gradation region. In the first image region, the quantization unit may perform the quantization with reference to the common threshold matrix in the first gradation region and the second gradation region. In the second image region, the quantization unit may perform the quantization with reference to the common threshold matrix in the first gradation region and perform the quantization in the second gradation region using an error diffusion method which uses, as a constraint condition of a dot array, the common quantization pattern or a threshold matrix pattern of gradations close to the common quantization pattern.

(Fifteenth Aspect): There is provided a non-transitory computer readable medium storing a program that causes a computer to execute: a defect information acquisition step of acquiring information about a defective recording element in a recording head in which a plurality of recording elements are arranged; a mask processing step of performing a mask process that makes the defective recording element unusable on the basis of the defective recording element information acquired in the defect information acquisition step; an image correction step of correcting image concentration of pixel rows, which are adjacent to a pixel row corresponding to the masked defective recording element, in input image data to reduce visibility of a streak-like image defect caused by the mask process; and a quantization processing step of quantizing the image data whose concentration has been corrected in the image correction step to convert the image data into binary or multi-valued image data with a smaller number of gradations than the concentration-corrected image data. The quantization processing step includes: a first quantization step of applying a first quantization method to a first image region which includes the pixel row corresponding to the masked defective recording element and the pixel rows adjacent to the pixel row to perform quantization; and a second quantization step of applying a second quantization method different from the first quantization method to a second image region other than the first image region to perform quantization. For at least some gradations, a first quantization pattern which is obtained by quantization using the first quantization method has a first pattern characteristic in which a spatial frequency component in a first direction parallel to a moving direction of a recording medium relative to the recording head is suppressed with respect to all spatial frequency components in a second direction perpendicular to the first direction, as compared to a second quantization pattern which is obtained by quantization using the second quantization method.

In the program according to the fifteenth aspect, the same specified matters as those described in the second to eighth aspects may be appropriately combined with each other.

(Sixteenth Aspect): There is provided an image forming device including: a recording head in which a plurality of recording elements are arranged; a relatively moving unit moving a recording medium relative to the recording head; a defect information acquisition unit acquiring information about a defective recording element in the recording head; a mask processing unit performing a mask process that makes the defective recording element unusable on the basis of the defective recording element information acquired by the defect information acquisition unit; an image correction unit correcting image concentration of pixel rows, which are adjacent to a pixel row corresponding to the masked defective recording element, in input image data to reduce visibility of a streak-like image defect caused by the mask process; a quantization processing unit quantizing the image data whose concentration has been corrected by the image correction unit to convert the image data into binary or multi-valued image data with a smaller number of gradations than the concentration-corrected image data; and for a controller controlling a recording operation of the recording elements in the recording head on the basis of the binary or multi-valued image data generated by the quantization processing unit. The quantization processing unit includes: a first quantization unit for applying a first quantization method to a first image region which includes the pixel row corresponding to the masked defective recording element and the pixel rows adjacent to the pixel row to perform quantization; and a second quantization unit applying a second quantization method different from the first quantization method to a second image region other than the first image region to perform quantization. For at least some gradations, a first quantization pattern which is obtained by quantization using the first quantization method has a first pattern characteristic in which a spatial frequency component in a first direction parallel to a moving direction of a recording medium relative to the recording head is suppressed with respect to all spatial frequency components in a second direction perpendicular to the first direction, as compared to a second quantization pattern which is obtained by quantization using the second quantization method.

In the image forming device according to the sixteenth aspect, the same specified matters as those described in the second to eighth aspects may be appropriately combined with each other. In this case, the matter specified as the "step" is specified as "unit" corresponding to the step.

According to the invention, even when an arbitrary number of defective recording elements occur at arbitrary positions in a recording element row of a recording head, it is possible to suppress the generation of an artifact or a reduction in granularity, using a combination of an image correction process and a quantization process, and thus to generate a high-quality dot image.

BRIEF DESCRIPTION OF THE DRAWINGS

FIG. 17 is a diagram illustrating an example of a point spread function (PSF) filter.

FIGS. 20A and 20B are diagrams illustrating examples of an isotropic PSF filter.

DESCRIPTION OF THE PREFERRED EMBODIMENTS

Hereinafter, embodiments of the invention will be described with reference to the accompanying drawings.

<Overall Flow of Image Processing>

Figure 1:
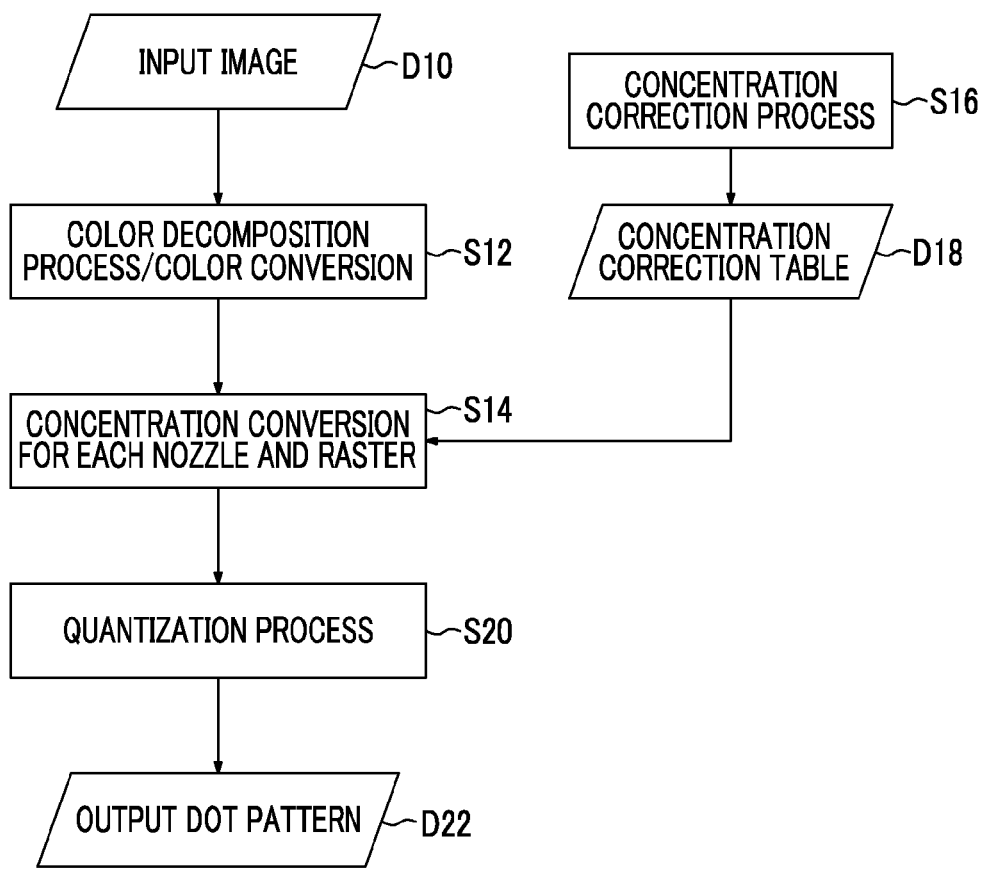
FIG. 1 is a flowchart illustrating the overall flow of an image processing method according to an embodiment of the invention.

First, the overall flow of image processing according to an embodiment will be described. FIG. 1 is a flowchart illustrating the overall flow of an image processing method according to the embodiment of the invention. Here, an example in which an inkjet recording device is used as an image output machine will be described. In the image processing according to the embodiment, a concentration correction (unevenness correction) process and a quantization process are performed for an input image (input image D10) (Steps S12 to S20). Finally, a process of converting the input image into a dot image (output dot pattern D22) which is suitable for dot recording by the inkjet recording device is performed.

As illustrated in FIG. 1, the input image (input image D10) is divided into images corresponding to each ink color used by the inkjet recording device (Step S12). At that time, the ratio of colors is determined so as to correspond to target colors ("a color decomposition process/a color conversion process"). In this way, the input image D10 is decomposed into unit images (a unit image×the number of colors) of each ink color. For example, when the inkjet recording device records an image using ink of four colors, that is, cyan (C), magenta (M), yellow (Y), and black (K), the input image D10 is decomposed into unit images of these colors (the number of colors=4) and a C image, an M image, a Y image, and a K image are obtained.

The correspondence between the position (pixel position) of each decomposed image of each color (each divided image of each color) and each nozzle of a single-pass-type inkjet recording device is made and concentration conversion is performed for each raster (scanning line) corresponding to the recording position of each nozzle (a position in a main scanning direction) (Step S14, which corresponds to an "image correction step").

If necessary, a resolution conversion process is performed in order to establish the correspondence relationship between each nozzle of the recording head and the pixels of image data. In addition, a gamma correction process (a process of correcting non-linearity between an input signal and output concentration) is performed for image data of each color.

The concentration conversion process for each raster (or nozzle) (Step S14) is performed with reference to a concentration correction table D18 in which the characteristics of the nozzles are reflected. The content of a concentration correction process (Step S16) for generating the concentration correction table D18 will be described below (see FIG. 2).

The non-uniformity of the concentration of an output image is corrected through the concentration conversion process (Step S14) using the concentration correction table D18. The image subjected to the image correction process (a concentration conversion process in Step S14) is quantized (Step S20, which corresponds to a "quantization process"). The discharge of ink from the recording head of the inkjet recording device is controlled on the basis of the output dot pattern D22 generated by the quantization process (Step S20) and drawing is performed.

<For Concentration Correction Process (Step S16)>

In the concentration correction process (Step S16 in FIG. 1) using the concentration correction table D18, concentration unevenness in a direction perpendicular to the sheet transportation direction and the state of the nozzles (for example, non-discharge or discharge in an incorrect direction) are read from the print result of a test chart and a gradation table (a lookup table indicating the relationship between an input gradation value and an output gradation value) for correcting concentration unevenness is generated for each raster (that is, for each nozzle).

Figure 2:
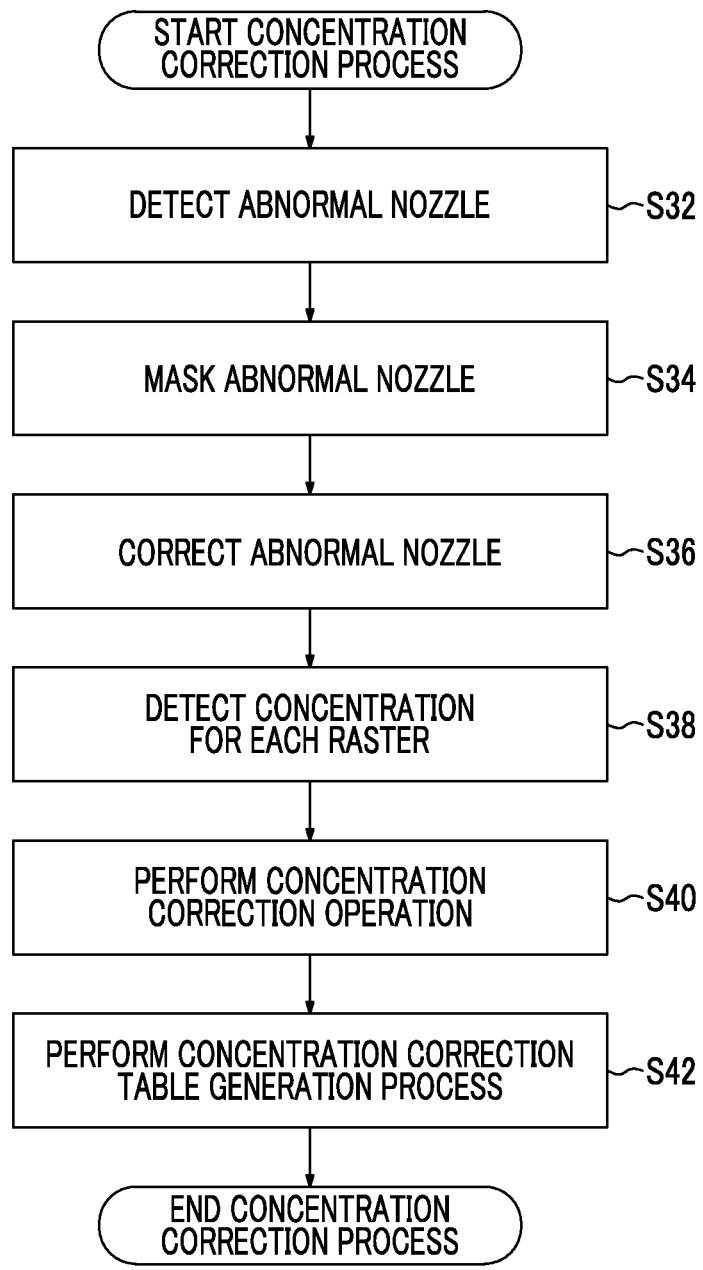
FIG. 2 is a flowchart illustrating a concentration correction process.

FIG. 2 is a flowchart illustrating the concentration correction process. The concentration correction process illustrated in FIG. 2 generates the concentration correction table D18 (see FIG. 1) which is used for gradation conversion for correcting concentration unevenness caused by recording characteristics for each nozzle and recording defects (streak unevenness) caused by a non-discharging nozzle.

In the concentration correction process, first, an abnormal nozzle is detected (an "abnormal nozzle detection process" in Step S32, which corresponds to a "defect information acquisition step"). When concentration unevenness caused by steaks which occur in a direction parallel to the sheet transportation direction is corrected, the position of the nozzles and the position (pixel position) of the image to be corrected need to appropriately correspond to each other. For example, when the deviation of the discharge direction of the nozzle from a correct direction is so large as to break the relationship between the position of the nozzle and the position of the pixel (the deviation of a landing position is large), a process different from a general process is required. In addition, when a nozzle defect occurs, it is preferable to perform correction using a special method. In this process, an abnormal nozzle is detected in order to determine a discharge failure (Step S32). Here, examples of the "abnormal nozzle" include a non-discharging nozzle, a significantly curved nozzle, a nozzle which has an error in the amount of droplets discharged, and a nozzle which has an unstable discharge operation. For example, the abnormal nozzles can be specified by a method which draws a line (segment) for each nozzle and calculates the amount of deviation of the discharge position (error in the landing position) from the drawing result of the line or a method which determines whether a line is present or absent. The abnormal nozzle corresponds to a "defective recording element".

The abnormal nozzles detected in Step S32 are processed according to their characteristics (Steps S34 and S36). For example, the significantly curved nozzle or the non-discharging nozzle is masked so as not to be used for drawing (the nozzle whose use is prohibited) (an "abnormal nozzle mask process" in Step S34, which corresponds to a "mask processing step"). When the abnormal nozzle is masked, concentration at the position of the pixel to be recorded by the nozzle is reduced. Therefore, correction for increasing the concentration (image signal value) of the pixels corresponding to normal nozzles in the vicinity of the abnormal nozzle is performed to compensate for the concentration (an "abnormal nozzle correction process" in Step S36).

Then, the concentration characteristics of each raster (or each nozzle) are measured (a "concentration detection process" in Step S38). For example, a screen tint for each gradation which is output to a recording medium (sheet) over the entire drawing width of the recording head (the width of a nozzle row in the x direction) and an optical scanner reads the output result to acquire the output concentration value of each gradation for each raster (or each nozzle).

A concentration patch which has, as an input value, multi-stage discrete gradation values that are arranged at appropriate gradation intervals can be output as an example of the screen tint for each gradation. For example, when the signal value of an image is represented by 256 gradations (0 to 255), a concentration patch having 8-stage gradation values which are arranged at an interval of "32" gradation levels can be output to calculate the concentration value of each gradation for each raster. For gradations (gradations between sampling points) other than the actually measured sampling points, interpolation can be performed, using the concentration values of gradations before and after the sampling point to calculate the concentration values of the gradations other than the actually measured sampling points. In this way, concentration characteristics indicating the relationship between an input gradation value and an output concentration for each raster (each nozzle) are obtained for all gradation values (the entire domain).

A table in which the read concentration characteristics (gradation characteristics) are inverted such that uniform concentration is obtained for each raster (each nozzle) is generated for each raster on the basis of the concentration characteristics of each raster (each nozzle) obtained in Step S38 and is stored as a concentration correction table (a "concentration correction operation process" in Step S40 and a "concentration correction table generation process" in Step S42).

<Effect of Image Correction Using Concentration Correction Table>

Figure 3:
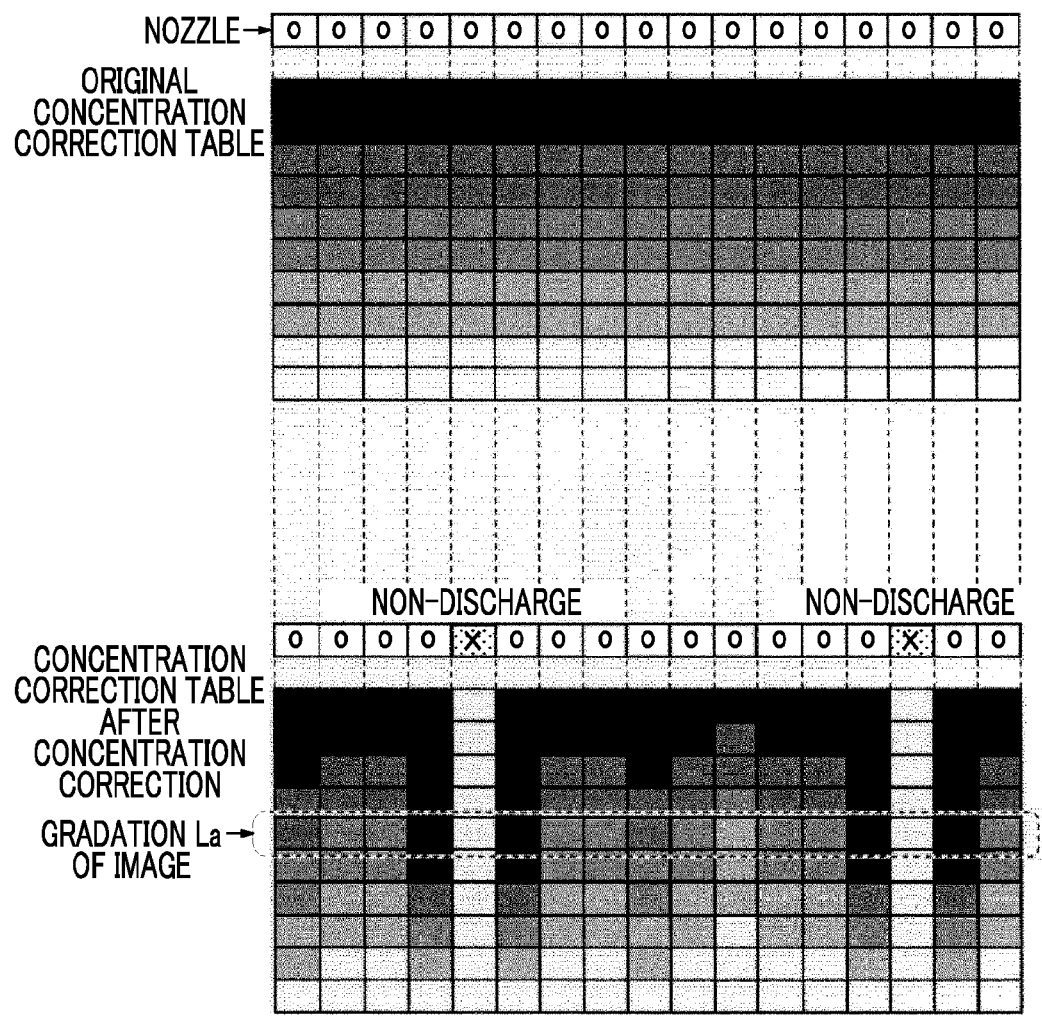
FIG. 3 is a conceptual diagram illustrating a concentration correction table.
Figure 4:
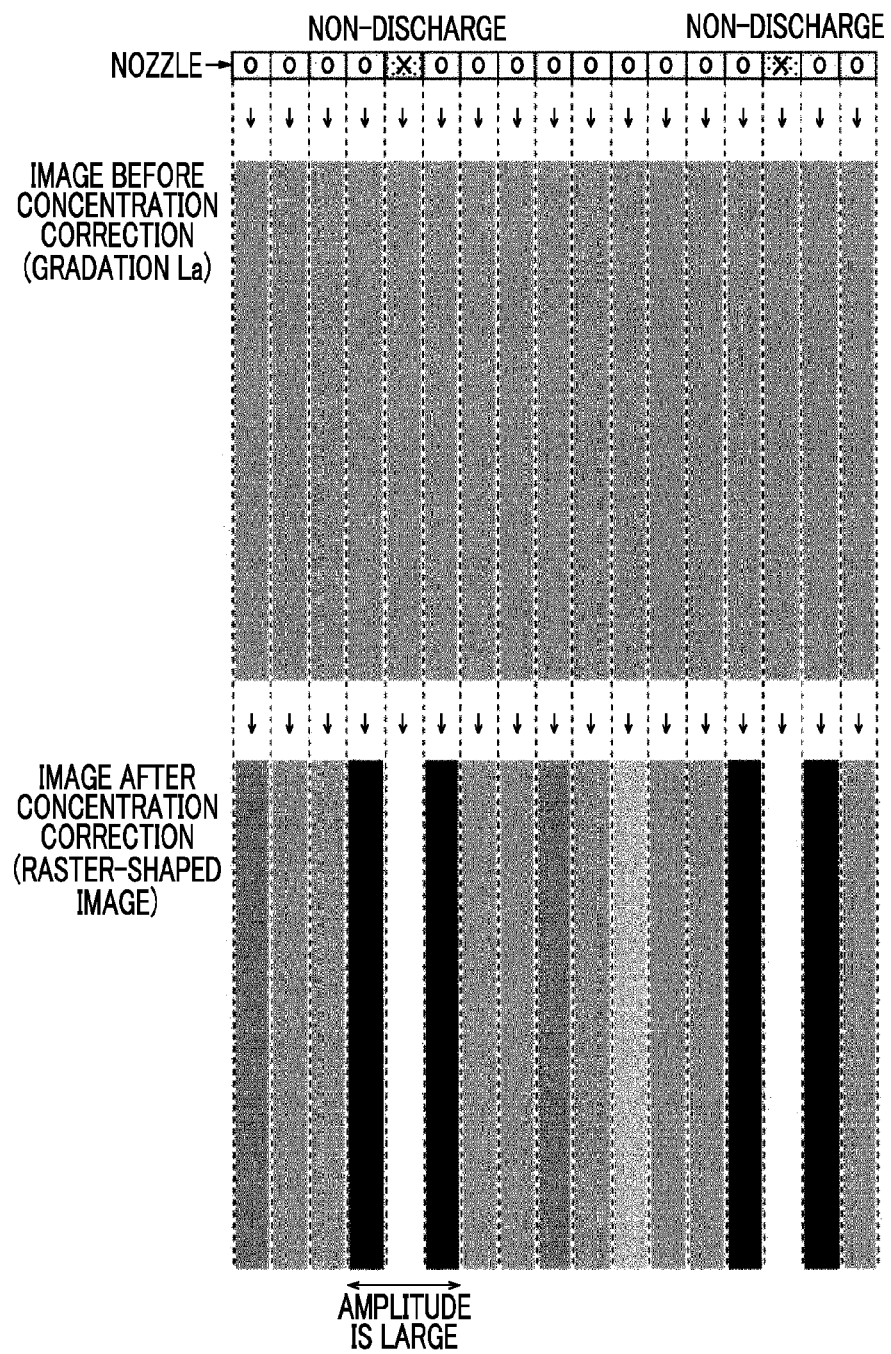
FIG. 4 is a conceptual diagram illustrating a corrected image whose gradation is converted using the concentration correction table.

FIG. 3 is conceptual diagram illustrating the concentration correction table (gradation table) for each raster. FIG. 4 is conceptual diagram illustrating an image (corrected image) whose gradation has been converted using the concentration correction table.

The upper side of FIG. 3 is a conceptual diagram illustrating an initialized concentration correction table (which is referred to as an "original concentration correction table") and the lower side of FIG. 3 is a conceptual diagram illustrating a concentration correction table after a concentration correction operation which is generated by the flow illustrated in FIG. 2.

The concentration correction table is a lookup table which specifies the relationship between an input gradation and an output gradation for each raster (that is, for nozzle). In FIG. 3, the horizontal axis indicates the position of nozzles. That is, cells which are arranged in the horizontal direction of the table illustrated in FIG. 3 indicate positions (nozzle positions or raster positions) corresponding to each nozzle (raster). The vertical direction (vertical axis) of the table indicates the input gradation and the shading of each cell indicates the output gradation. In FIG. 3, 10-stage input gradation values are illustrated in the vertical direction of the table for the sake of simplicity of illustration. However, in the actual table, the input gradation values are arranged in a number of stages greater than the ten stages. For example, when an image signal with 256 gradations is treated, output gradation values in the range of 0 to 255 are associated with input gradation values of 0 to 255, respectively.

Among the nozzle rows illustrated on the lower side of FIG. 3, a nozzle which is represented by the letter "x" is detected as the abnormal nozzle and is a nozzle (unusable nozzle) from which no ink is discharged by the mask process. The concentration correction table after a concentration correction operation which is created by the concentration correction process described with reference to FIG. 2 corrects the concentration of the pixels which are located on both sides of the masked nozzle so as to be increased. In addition, an output gradation at the position of each nozzle is determined according to the discharge characteristics of each nozzle in the nozzle row.

The effect of the image correction using the concentration correction table after a concentration correction operation which is illustrated on the lower side of FIG. 3 will be described with reference to FIG. 4. The upper side of FIG. 4 indicates original image data (image before correction) before image correction using the concentration correction table and the lower side of FIG. 4 indicates image data (corrected image) after image correction using the concentration correction table.

The image before correction which is illustrated on the upper side of FIG. 4 is a uniform gradation image specified by a gradation value La. An output gradation value at the position of each nozzle having a gradation value La as the input gradation value is regulated to belong to a cell group which corresponds to one row surrounded by a dashed line in the concentration correction table illustrated on the lower side of FIG. 3. Therefore, in the image after concentration correction, the gradation value of each raster is determined according to the concentration correction table, as illustrated on the lower side of FIG. 4. As such, concentration is corrected in the unit of pixel rows in the vertical direction (sheet transportation direction) of FIG. 4 and the corrected image becomes an image with a vertical striped pattern. The amplitude of shading increases in the vicinity of the raster corresponding to the masked nozzle.

A known method can be used to perform the concentration correction (unevenness correction).

<For Quantization Method>

The quantization process (Step S20 in FIG. 1) according to the embodiment is performed with reference to a threshold matrix in which a low-frequency component is suppressed in a raster direction (sheet transportation direction) in which the concentration correction is performed. First, the characteristics of the threshold matrix will be described.

[Characteristics of Threshold Matrix Used in the Embodiment]

As described above, when concentration correction is performed for the pixel row arranged in the raster direction, an artifact is generated or granularity is reduced due to a beat of a low-frequency component of a spatial frequency in the sheet transportation direction which is generated by raster-shaped concentration correction and BEAT of a frequency component of a quantization pattern.

In the embodiment, a low-frequency component in the sheet transportation direction in the quantization pattern is suppressed in order to remove BEAT. Therefore, the interference of frequency components is suppressed. As a result, it is possible to suppress the generation of an artifact or a reduction in granularity.

The threshold matrix (dither matrix) used in the embodiment represents a dot array (quantization pattern) in which a low-frequency component in the sheet transportation direction is suppressed in a specific halftone region (which corresponds to "at least some gradations").

[For General Halftone Pattern]

Figure 5:
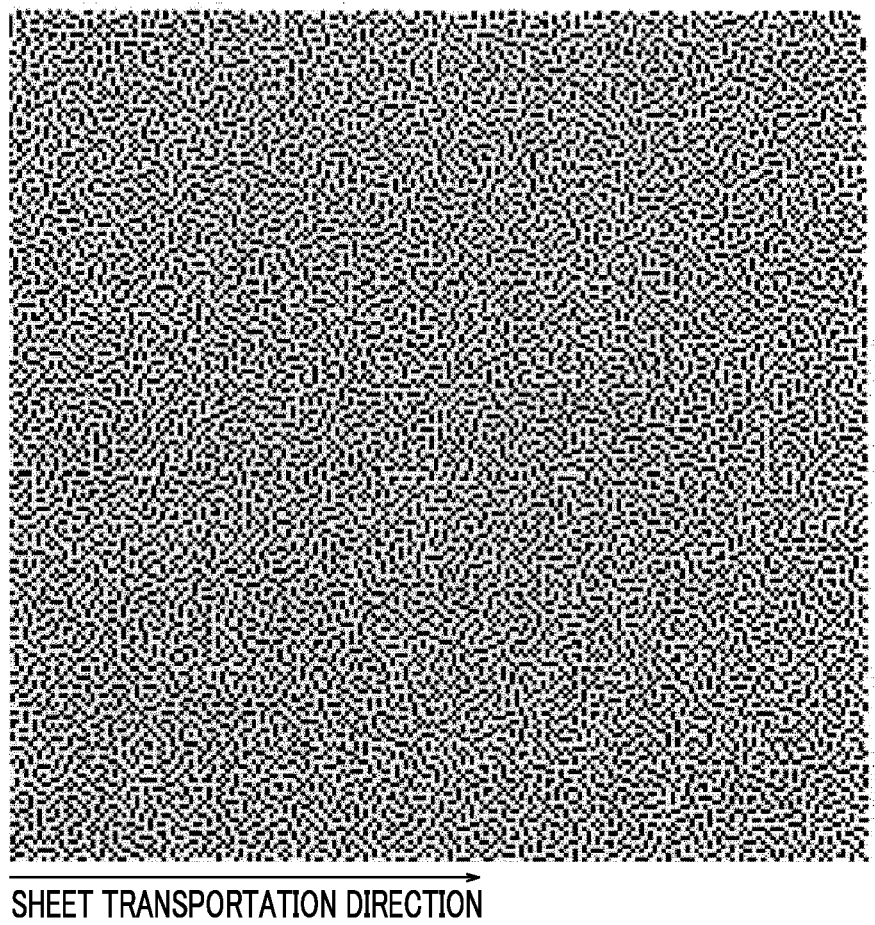
FIG. 5 is a diagram illustrating an example of a general quantization pattern.
Figure 6:
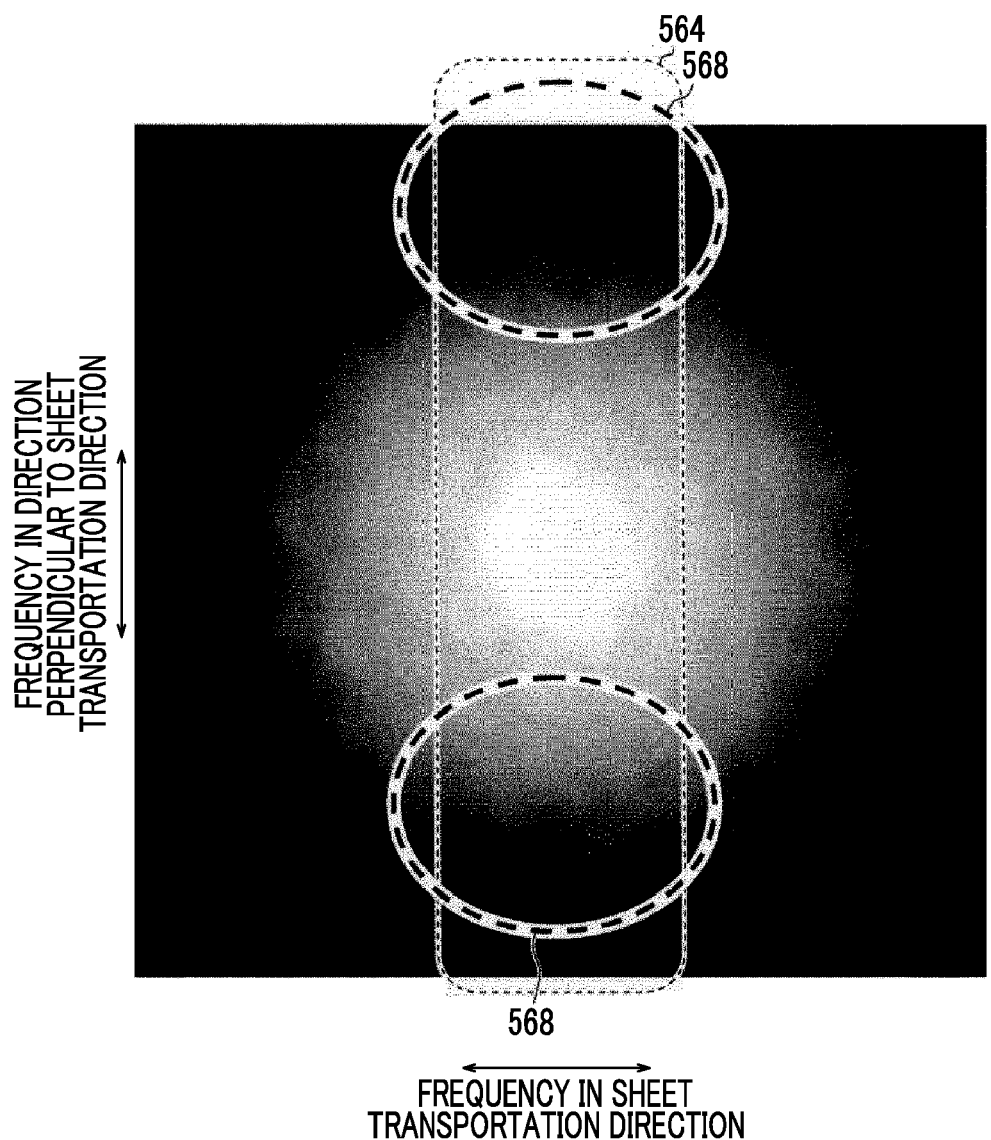
FIG. 6 is a diagram illustrating frequency characteristics of the quantization pattern illustrated in FIG. 5.
Figure 7A:
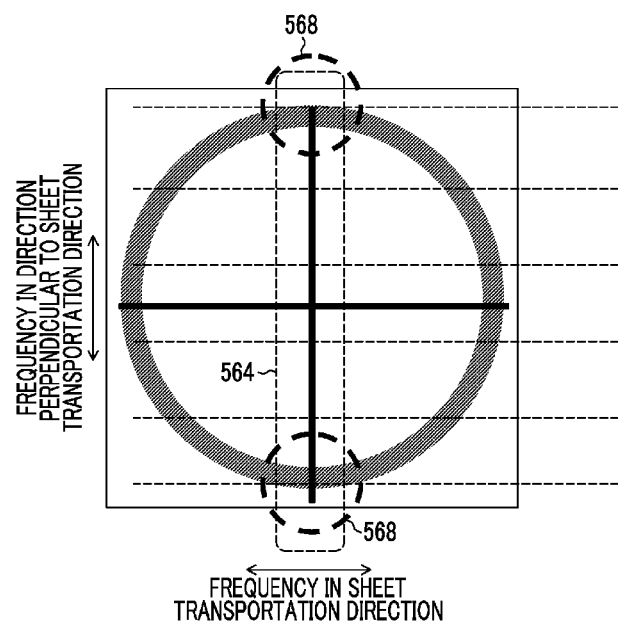
FIG. 7A is a schematic view illustrating a frequency spectrum of a general threshold matrix and FIG. 7B is a cross-sectional view illustrating the frequency spectrum illustrated in FIG. 7A in a sheet transportation direction.

A general quantization pattern according to the related art will be described for the sake of comparison. FIG. 5 illustrates an example of the general quantization pattern of a given halftone and FIG. 6 illustrates the frequency characteristics thereof. In FIG. 5, the horizontal direction is the sheet transportation direction and the vertical direction is the direction perpendicular to the sheet transportation direction (the direction in which the nozzles are arranged). Two-dimensional Fourier transform is performed for the halftone pattern illustrated in FIG. 5 to obtain the frequency characteristics illustrated in FIG. 6. In FIG. 6, the intensity of frequency components is represented by shading. In FIG. 6, the horizontal direction indicates a spatial frequency in the sheet transportation direction and the vertical direction indicates a spatial frequency in the direction perpendicular to the sheet transportation direction. FIG. 7A is a schematic view of FIG. 6.

Figure 7B:
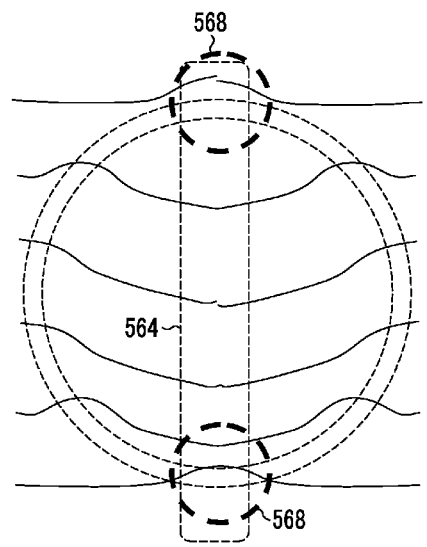

FIG. 7A is a schematic view illustrating a frequency spectrum of the general threshold matrix and FIG. 7B is a cross-sectional view illustrating the frequency spectrum illustrated in FIG. 7A in the sheet transportation direction. In FIG. 7A, the horizontal direction is the sheet transportation direction. In FIGS. 7A and 7B, the vertical direction is the direction perpendicular to the sheet transportation direction. A region (a region surrounded by a dashed rectangle represented by reference numeral 564) in the vicinity of the vertical axis which passes through the origin (0, 0) of the frequency spatial coordinate system illustrated in FIGS. 6 and 7A corresponds to the low-frequency component in the sheet transportation direction. The region represented by reference numeral 564 is referred to as a "sheet-transportation-direction low-frequency component region".

In the sheet-transportation-direction low-frequency component region 564 of the general quantization pattern, a high-concentration region which is surrounded by a thick dashed line represented reference numeral 568 has a frequency component (halftone component). That is, a halftone component is present in the sheet-transportation-direction low-frequency component region 564, which causes BEAT. The low-frequency component is seen in the sheet-transportation-direction low-frequency component region 564 and granularity is reduced.

[For Quantization Pattern According to the Embodiment]

Figure 8:
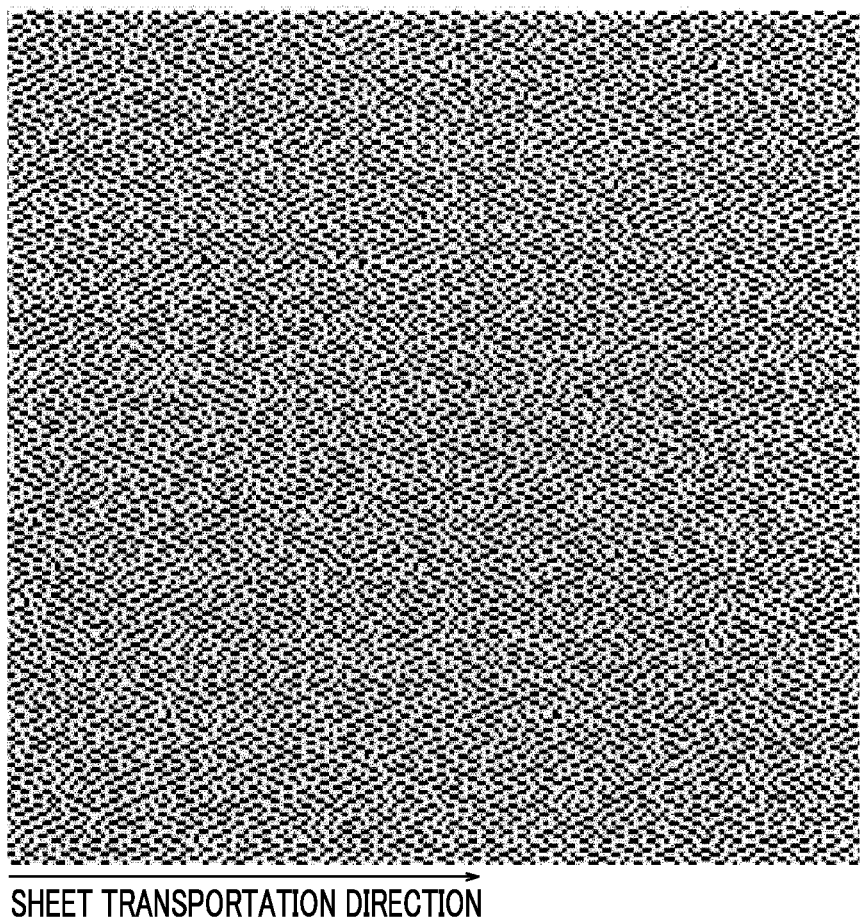
FIG. 8 is a diagram illustrating an example of a quantization pattern obtained from a threshold matrix according to the embodiment.
Figure 9:
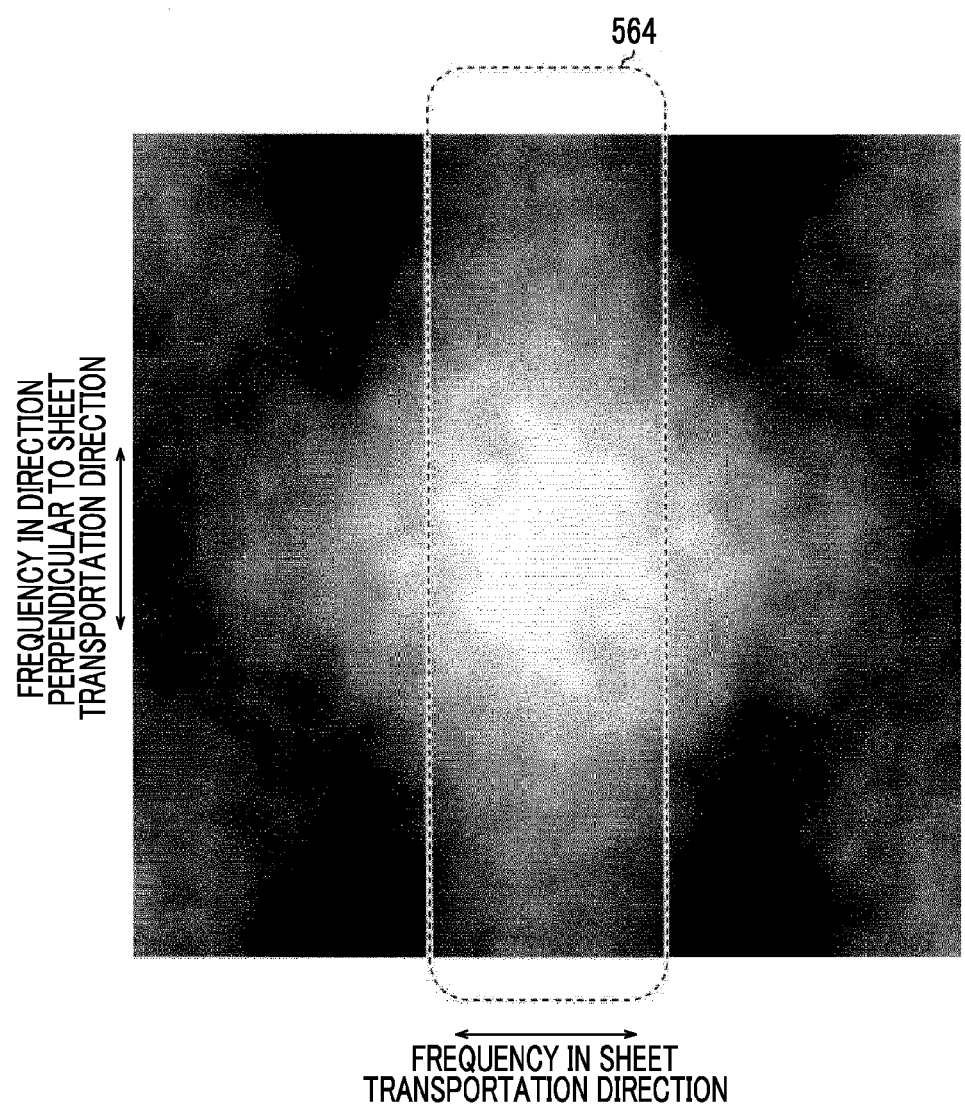
FIG. 9 is a diagram illustrating frequency characteristics of the quantization pattern illustrated in FIG. 8.

In contrast, in the quantization pattern according to the embodiment, the low-frequency component in the sheet transportation direction is suppressed in order to solve the above-mentioned problems. FIG. 8 illustrates an example of the quantization pattern obtained from the threshold matrix according to the embodiment and FIG. 9 illustrates the frequency characteristics thereof. In FIG. 8, the horizontal direction is the sheet transportation direction and the vertical direction is the direction perpendicular to the sheet transportation direction (the direction in which the nozzles are arranged). Two-dimensional Fourier transform is performed for the quantization pattern illustrated in FIG. 8 to obtain the frequency characteristics illustrated in FIG. 9. In FIG. 9, the horizontal direction indicates a component in the sheet transportation direction and the vertical direction indicates a component in the direction perpendicular to the sheet transportation direction. FIG. 10A is a schematic view of FIG. 9.

Figure 10:
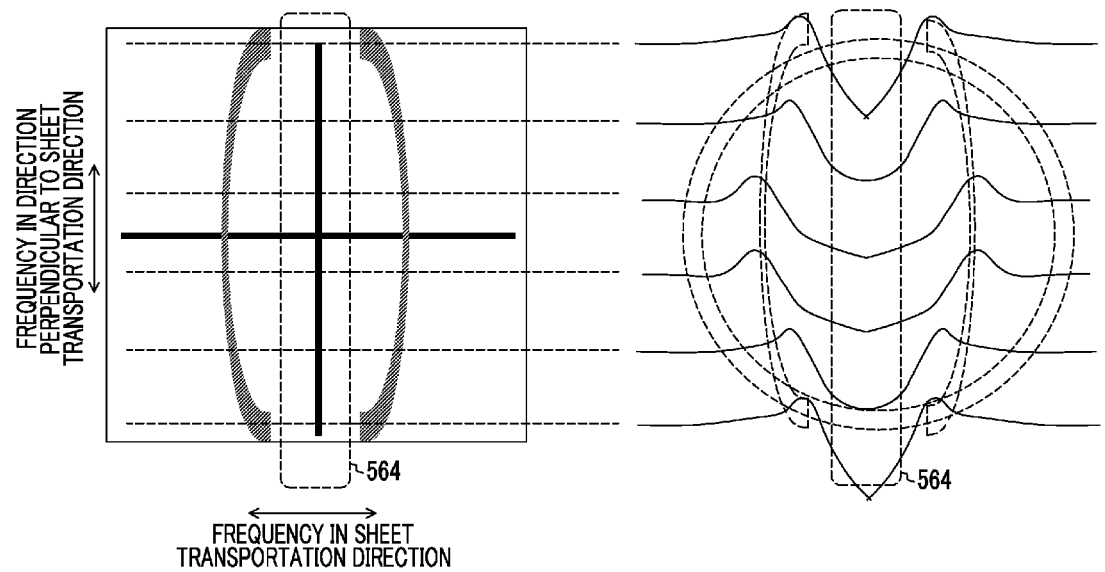
FIG. 10A is a schematic view illustrating a frequency spectrum of the threshold matrix according to the embodiment and FIG. 10B is a cross-sectional view illustrating the frequency spectrum illustrated in FIG. 10A in the sheet transportation direction.

FIG. 10A is a schematic view illustrating a frequency spectrum of the threshold matrix according to the embodiment and FIG. 10B is a cross-sectional view illustrating the frequency spectrum illustrated in FIG. 10A in the sheet transportation direction. FIG. 8 to FIGS. 10A and 10B can be contrasted with FIG. 5 to FIGS. 7A and 7B, respectively.

In the threshold matrix according to the embodiment, as illustrated in FIG. 9 and FIGS. 10A and 10B, in the region (sheet-transportation-direction low-frequency component region) which is surrounded by the dashed rectangle represented by reference numeral 564, the low-frequency component in the sheet transportation direction is suppressed for all components in the direction perpendicular to the sheet transportation direction (regardless of components in the direction perpendicular to the sheet transportation direction). That is, in FIG. 9, there are few high-concentration components in the sheet-transportation-direction low-frequency component region which is surrounded by the dashed rectangular represented by reference numeral 564. Alternatively, as illustrated in FIG. 10B, when the distribution of the components is plotted as section lines in the sheet transportation direction, all of the section lines have a minimum value in a region corresponding to the sheet-transportation-direction low-frequency component region (reference numeral 564). Hereinafter, in some cases, the characteristics in which the low-frequency component in the sheet transportation direction is suppressed so as to be less than a predetermined value with respect to all of the components in the direction perpendicular to the sheet transportation direction (regardless of the components in the direction perpendicular to the sheet transportation direction) are referred to as "suppression characteristics". In the suppression characteristics, the low-frequency component in the sheet transportation direction is suppressed such that BEAT caused by raster-shaped frequency characteristics and the frequency characteristics of the quantization pattern is reduced. Specifically, in the suppression characteristics, in a first quantization pattern corresponding to a region which is in the vicinity of a non-discharge region including a pixel row corresponding to a masked non-discharging nozzle and pixel rows adjacent to the pixel row, the low-frequency component in the sheet transportation direction is suppressed with respect to all of the components in the direction perpendicular to the sheet transportation direction, as compared to a second quantization pattern corresponding to a normal region other than the above-mentioned region.

As such, the low-frequency components in the sheet transportation direction are suppressed regardless of the components in the direction perpendicular to the sheet transportation direction. Therefore, even when non-discharge (mask process) occurs with any spatial period in the direction perpendicular to the sheet transportation direction (the direction in which the nozzles are arranged), a concentration distribution (a low-frequency component of the non-discharging nozzle) in the sheet transportation direction due to concentration correction is not generated. Therefore, an artifact is not generated or granularity is not reduced.

It is preferable that the low-frequency component to be suppressed in the sheet transportation direction is equal to or less than 10 cycles/mm. The generated beat is the difference between the spatial frequency (fx, fy) of the quantization pattern and the spatial frequency (fx', 0) of the image after raster-shaped concentration correction. When unevenness satisfying fx'=fx occurs, a beat with the lowest frequency is generated. In this case, the frequency of the beat is fy−0=fy. When the frequency of the beat is about fy>10 cycles/mm, the beat is less likely to be seen due to the frequency characteristics of the human eye (the visual characteristics of the human eye). Therefore, it is preferable to suppress the low-frequency component. That is, it is preferable to suppress a low-frequency component equal to or less than 10 cycles/mm.

Figure 11:
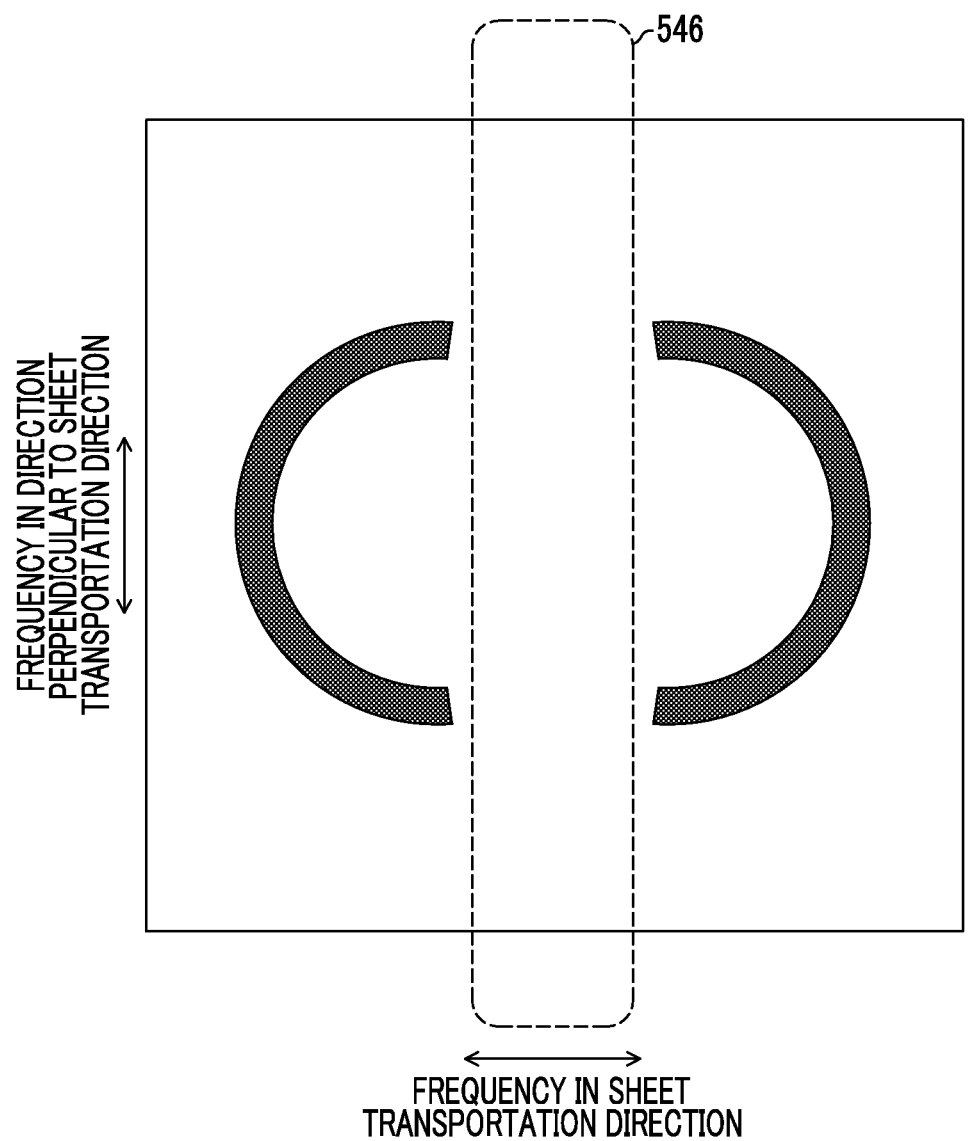
FIG. 11 is a schematic view illustrating an example of a frequency spectrum of a threshold matrix according to another embodiment.
Figure 12:
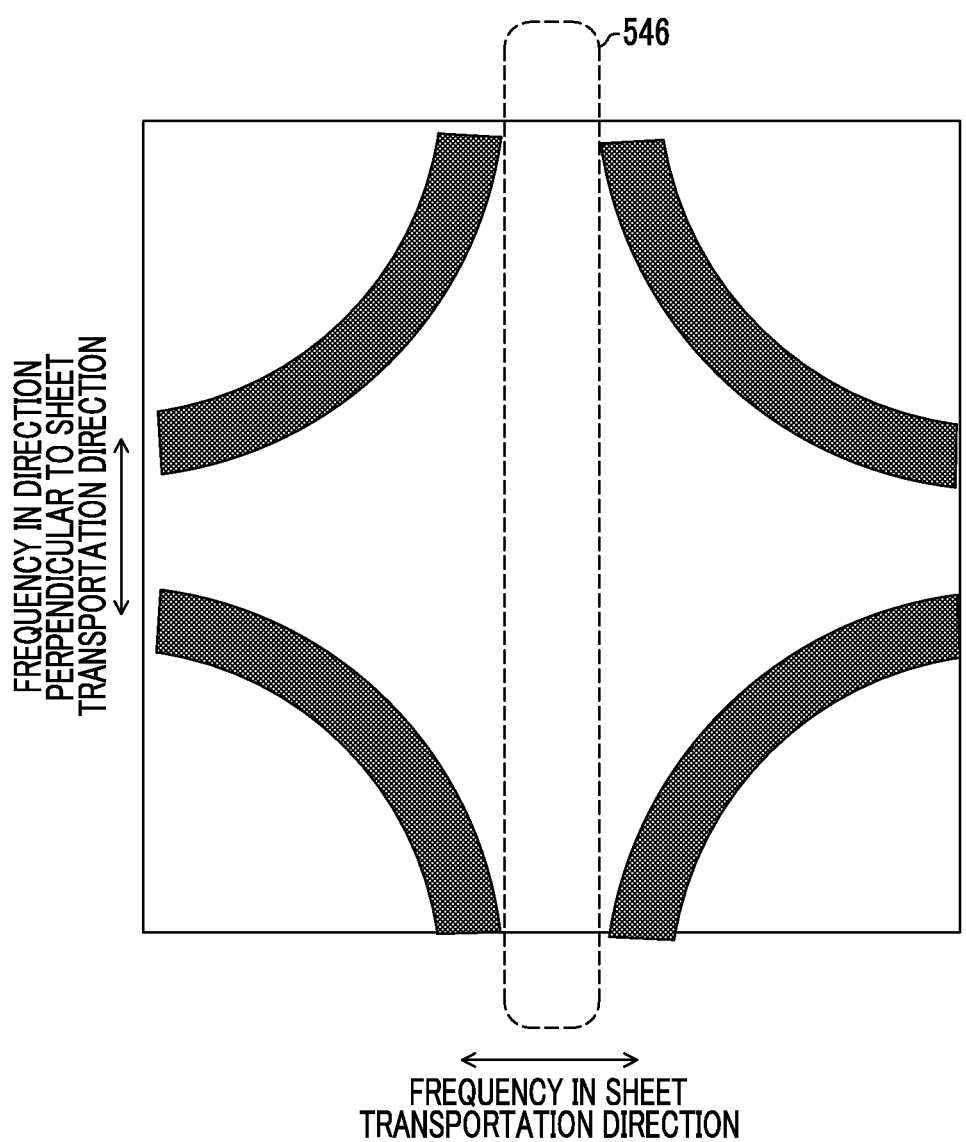
FIG. 12 is a schematic view illustrating an example of a frequency spectrum of a threshold matrix according to another embodiment.

The frequency characteristics are not limited to those illustrated in FIGS. 9 and 10. The threshold matrix according to the embodiment may have any frequency spectrum as long as the low-frequency component in the sheet transportation direction is suppressed. Frequency spectrums other than those illustrated in FIGS. 9 and 10 may be used. FIGS. 11 and 12 illustrate examples of other frequency spectrums. A quantization pattern having the frequency spectrum illustrated in FIG. 11 or FIG. 12 can be used.

According to the quantization pattern having the frequency spectrum, even when, for example, streaks occur in the sheet-transportation-direction low-frequency component region, granularity is not reduced since there are no frequency components in the region (few frequency components are present and suppressed).

<Threshold Matrix Creation Method>

The threshold matrix in which the low-frequency components in the sheet transportation direction (that is, the raster direction) are suppressed can be created by various methods. Hereinafter, an example of the creation method will be described.

<<Outline of Example of Generation of Gradation Pattern>>

Figure 13:
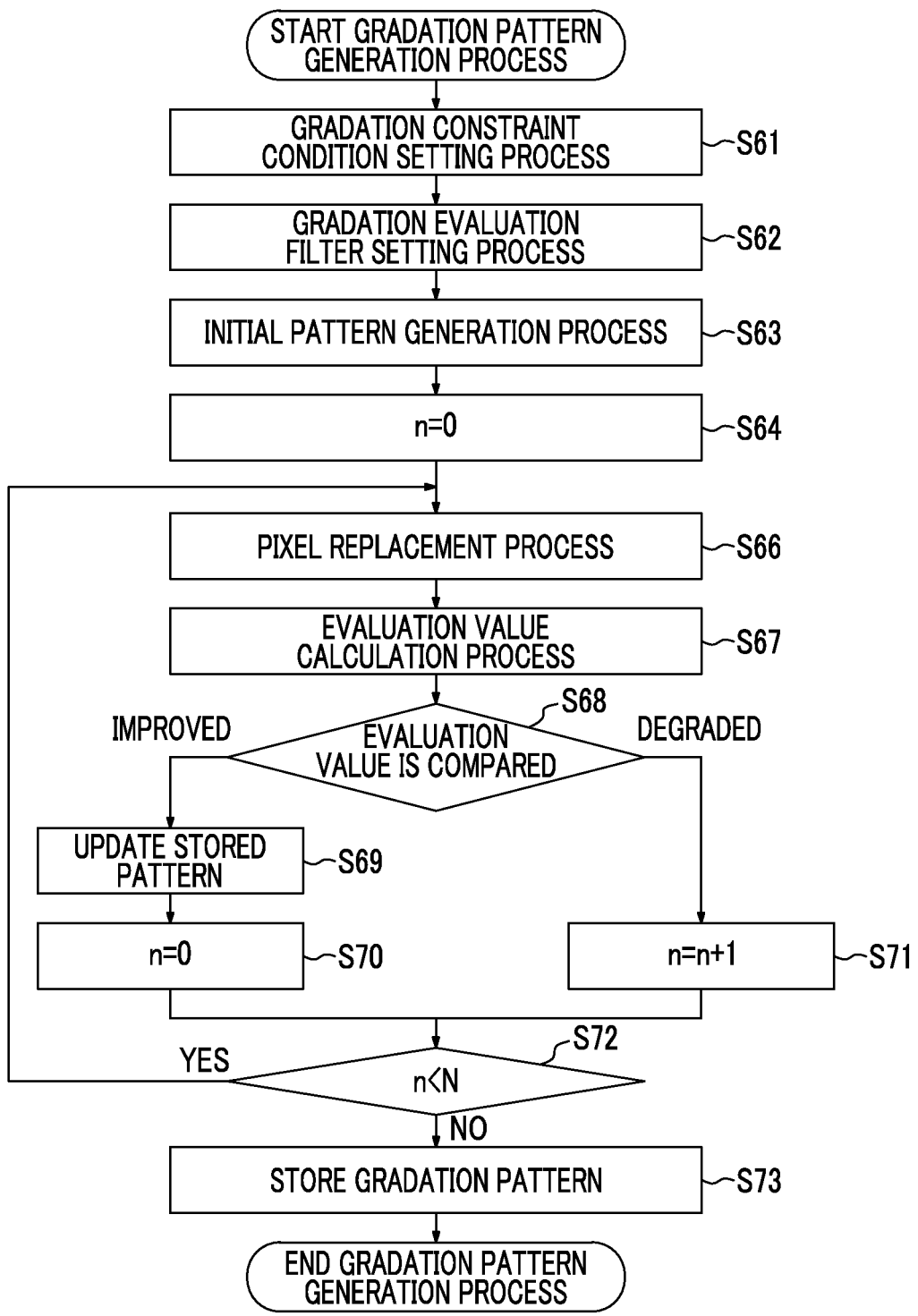
FIG. 13 is a flowchart illustrating an example of a pattern generation process for each gradation.

FIG. 13 illustrates an example of the generation of a gradation pattern. Each gradation pattern is generated by optimizing an initial pattern generated by random numbers (initial pattern generation process) with respect to the evaluation value of the initial pattern, using a process of sequentially replacing dots according to constraint conditions and the evaluation value of the pattern, on the basis of the constraint conditions. The constraint conditions are set in order to restrict the replacement position of dots when a process of replacing the position of cells (pixels) in which the dots are arranged is performed.

FIG. 13 is a flowchart illustrating the process of generating each gradation pattern. Components in the flowchart of FIG. 13 will be described below.

A gradation constraint condition setting process in Step S61 designates a region in which the replacement of dots is permitted (that is, a region in which the array of dots can be changed by optimization using the evaluation value as an index) in a pixel replacement process (Step S66) which will be described. For example, the following two constraint conditions are set.

(Constraint condition 1): A high-gradation pattern includes a low-gradation pattern, which is a condition generally required for a dither matrix.

(Constraint condition 2): the position of dots is restricted such that the pattern has specific characteristics, in order to improve, for example, image quality. In the embodiment, as described with reference to FIGS. 9 to 12, a pattern having pattern characteristics in which the low-frequency components in the sheet transportation direction are suppressed can be applied as constraint condition 2. In addition, since the pattern illustrated in FIG. 16 satisfies the suppression characteristics, the pattern can also be applied as the constraint conditions. Since the implementation of the suppression characteristics can be introduced into a process which will be described below, constraint condition 2 may not be satisfied.

An evaluation filter setting process in Step S62 designates an evaluation filter to be used in, for example, the pixel replacement process (Step S66) and an evaluation value calculation process (Step S67). The evaluation filter is a frequency filter indicating a weight for each frequency component and is used when a dot pattern is multiplied by a frequency space (convoluted with a real space). The characteristics of the evaluation filter are reflected in the characteristics of the pattern. Therefore, in the embodiment, as a result of optimization, the evaluation filter with the pattern characteristics that the low-frequency components in the sheet transportation direction are suppressed is generated. As a result, it is possible to achieve the object.

The evaluation filter is used in the following process.

(1) In the pixel replacement process (Step S66), the evaluation filter is used to designate the position of the dot to be replaced.

(2) In the evaluation value calculation process (Step S67), an evaluation value comparison process (Step S68), and a stored pattern/evaluation value update process (Step S69), the evaluation filter is used to determine the evaluation value of the pattern. In addition, different evaluation filters can be set for each gradation, which will be described in detail below.

An initial pattern generation process in Step S63 of FIG. 13 sets an initial pattern when the pattern (the array of dots) is optimized. The pattern is set according to the following procedures.

(Procedure 1) The number of dots/voids required for gradations is calculated. For example, in the case of 8-bit gradations L, the number of dots required is $(L/2^8) \times a$ matrix size.

(Procedure 2) Random numbers equal to the matrix size are generated.

(Procedure 3) The number of dots designated by (procedure 1) is arranged at positions in descending order of the values of the random numbers in the region in which the replacement of the dots is permitted by the gradation constraint condition. In addition, when gradation patterns above and below a target gradation have been determined, they are appropriately reflected in the pattern. That is, the relationship in which the high-gradation pattern includes the low-gradation pattern is maintained without breaking the determined pattern.

In Step S64, the value (n) of a counter is reset to "0".

Figure 14:
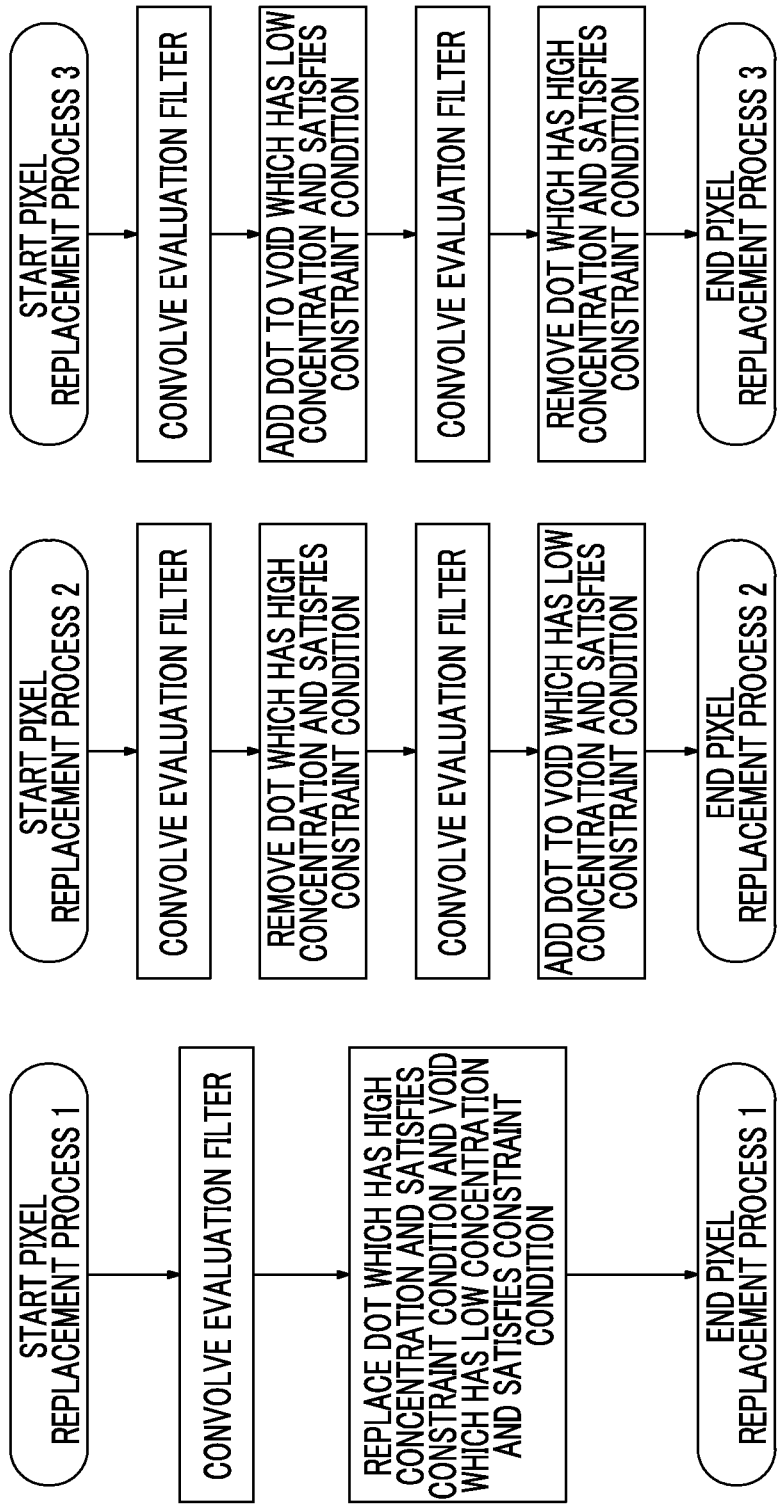
FIGS. 14A, 14B, and 14C are flowcharts illustrating an example of a pixel replacement process.

In the pixel replacement process of Step S66, for example, the dot pattern is updated according to the flow illustrated in FIGS. 14A to 14C.

FIGS. 14A to 14C illustrate three flowcharts. In each flowchart, first, the dot pattern is multiplied (convolved with) by the evaluation filter to calculate a concentration distribution for evaluation. Then, a basic process which replaces a high-concentration dot in the region satisfying the replacement constraint condition with a void with low concentration is common.

FIG. 14A illustrates the flow of the above-mentioned process which is performed in one step. FIGS. 14B and 14C illustrate examples of the process which is performed in two steps. The pixel replacement process (Step S66) is repeatedly performed during an optimization process. However, for example, only "pixel replacement process 1" illustrated in FIG. 14A may be constantly performed. Alternatively, pixel replacement processes 1 to 3 including "pixel replacement process 2" illustrated in FIG. 14B and "pixel replacement process 3" illustrated in FIG. 14C may be randomly selected. In pixel replacement process 1 illustrated in FIG. 14A, the number of convolutions of the evaluation filter is less than that in processes 2 and 3 and a calculation speed is higher than that in processes 2 and 3. Therefore, pixel replacement process 1 may be performed at the beginning of the optimization process. In addition, a method for selecting processes 1 to 3 may be changed depending on gradations.

The evaluation value calculation process of Step S67, the evaluation value comparison process of Step S68 and the stored pattern/evaluation value update process from Step S69 to Step S73 in FIG. 13 are performed as follows.

In the evaluation value calculation process (Step S67), the dot pattern changed by the pixel replacement process of Step S66 is multiplied (convolved) by the evaluation filter to calculate the concentration distribution for evaluation. Then, the standard deviation of the concentration distribution is calculated and is then used as an evaluation value. When the pixel replacement process (Step S66) from Step S66 to Step S72 and the evaluation value calculation process (Step S67) are repeatedly performed and the evaluation value is improved by the evaluation value comparison process (Step S68), the corresponding pattern and the evaluation value are stored (Step S69). In the subsequent process, the stored evaluation value is compared with the calculated evaluation value (Step S68) to determine whether the evaluation value is improved.

The pixel replacement process and the evaluation value calculation process are repeatedly performed until the pattern is not updated (Step S66 to 72) to optimize the gradation pattern with respect to the evaluation value. The optimized gradation pattern is stored (Step S73). Then, the process ends.

[Example 1 of Threshold Matrix Creation Method]

A method using a point spread function (PSF) and a low-frequency filter will be described. The term "low-frequency filter" means a filter which emphasizes or suppresses components with a frequency lower than a cutoff frequency and maintains components with a frequency equal to or higher than the cutoff frequency. An appropriate process is performed for low-frequency components which are determined by the low-frequency filter. Whether to emphasize or suppress the components with a frequency lower than the cutoff frequency is determined by an algorithm. Therefore, the components with a frequency lower than the cutoff frequency may be emphasized or suppressed. In the following description, a filter which emphasizes the components with a frequency lower than the cutoff frequency is given as an example.

A filter for uniformizing the array of the dots in each raster in the sheet transportation direction and a filter for emphasizing a low-frequency component are convolved with the dot pattern and the array of the dots is replaced such that the multiplication result is flattened. This process is repeatedly performed to generate a target threshold matrix.

For example, an evaluation filter which emphasizes a low-frequency component and a sheet-transportation-direction low-frequency component is generated. The evaluation filter is applied to the above-mentioned process (that is, the process which repeatedly performs the convolution of the evaluation filter with the dot pattern and the replacement of the array of the dots such that the multiplication result is flattened) to generate a (flattened) pattern without an emphasized component, that is, a pattern in which the low-frequency component in the transportation direction is suppressed.

Next, a method which multiplies a filter (low-frequency filter) for emphasizing a low-frequency component by a filter (PSF) for emphasizing a sheet-transportation-direction low-frequency component to generate an evaluation filter (low-frequency filter×fft (PSF)) will be described.

Figure 15:
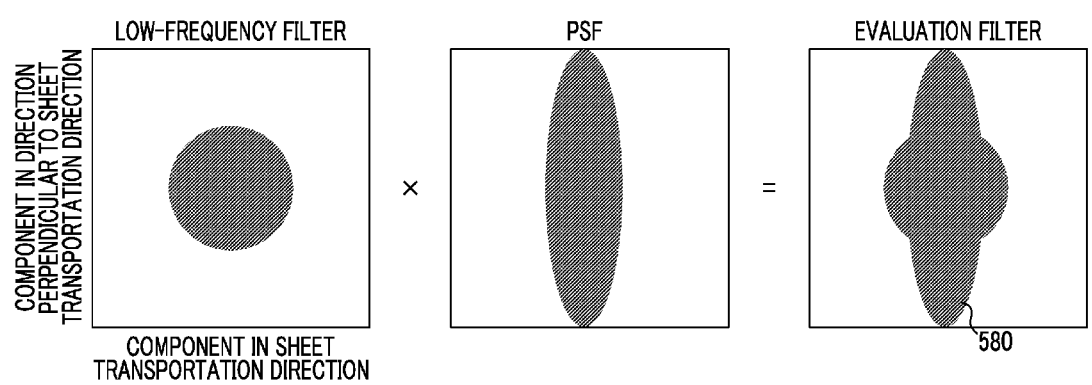
FIG. 15 is a conceptual diagram illustrating an example of a method for generating an evaluation filter.

FIG. 15 is a conceptual diagram illustrating the method which multiplies the low-frequency filter by the PSF to generate the evaluation filter. FIG. 15 schematically illustrates the frequency characteristics of the low-frequency filter, the PSF, and the evaluation filter. In FIG. 15, a component in a frequency space which is emphasized by each filter is illustrated as a gray portion. The low-frequency filter illustrated on the leftmost side of FIG. 15 isotropically emphasizes the low-frequency component in the sheet transportation direction and the low-frequency component in the direction perpendicular to the sheet transportation direction. The PSF illustrated at the center of FIG. 15 emphasizes the low-frequency component in the sheet transportation direction. Therefore, as illustrated in FIG. 15, the PSF has characteristics with an elliptical shape which is elongated in the direction perpendicular to the sheet transportation direction. The evaluation filter illustrated on the rightmost side of FIG. 15 is generated by the multiplication between the low-frequency filter and the PSF and has characteristics obtained by overlapping the characteristics of the low-frequency filter and the PSF. The evaluation filter emphasizes a component in the gray portion represented by reference numeral 580. That is, the low-frequency component 580 emphasized by the evaluation filter is a suppressed component.

Figure 16:
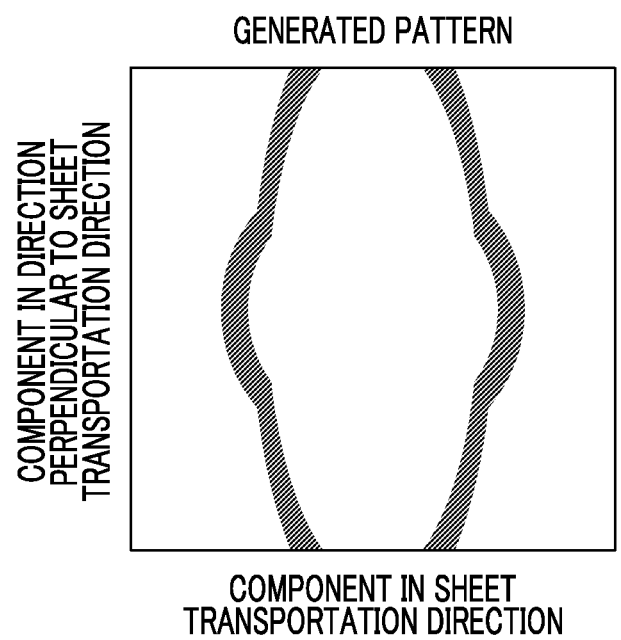
FIG. 16 is a diagram schematically illustrating frequency characteristics of a pattern generated by the evaluation filter.

FIG. 16 is a schematic diagram illustrating the frequency characteristics of the pattern generated by the application of the evaluation filter illustrated in FIG. 15. As illustrated in FIG. 16, in the generated pattern, the component emphasized by the evaluation filter is suppressed.

<<Example of PSF (Real Space)>>

The matrix illustrated in FIG. 17 can be used as an example of PSF(x, y). In FIG. 17, the vertical direction is the sheet transportation direction and the horizontal direction is the direction perpendicular to the sheet transportation direction. The matrix is a filter which emphasizes a component in the sheet transportation direction in a high-frequency range, as compared to a component in the vertical direction, when Fourier transform is performed. Therefore, the application of this filter makes it possible to generate a pattern in which the suppression range of low-frequency components in the sheet transportation direction expands to the higher frequency side.

<<For Example of Low-Frequency Filter>>

The low-frequency filter is used to determine the component to be seen by the eye. It is preferable that the low-frequency filter emphasizes components with a frequency that is equal to or less than the cutoff frequency based on visibility.

For example, the filter can be represented as follows.

$$F(k)=(L_o-1)(1-k/k_0)^n\theta(k_0-k)+1 \qquad \text{[Expression 1]}$$

In Expression 1, k is a radial frequency (k≥0). In addition, $\theta(x)$ is a unit step function and $\theta(x)=1$ (x≥0) and $\theta(x)=0$ (x<0) are established. Furthermore, $k_0$ is the cutoff frequency and is roughly determined by human visibility.

In addition, $L_o$ and n are fitting parameters and are any real numbers. It is preferable that $L_o$ is a real number greater than 1 and n is a real number equal to or greater than 2.

The filter has a value of 1 and holds components when the frequency is equal to or greater than the cutoff frequency $k_0$ and gradually increases from 1 to L0 as the frequency becomes closer to 0 and emphasizes components when the frequency is less than the cutoff frequency $k_0$.

<<Example of Replacement of Dot Array after Convolution Operation>>

Example 1

When the dot pattern is img(y, x),

Step 1: The PSF (FIG. 17) and the low-frequency filter are convolved with the pattern as follows:

$$IM(y,x)=ifft(fft(img)*fft(PSF)*F(k))$$

In the above-mentioned expression, "fft" indicates fast Fourier transform and "ifft" indicates inverse fast Fourier transform.

Step 2: In the convolved pattern, a portion with a maximum sized dot and a portion without a minimum sized dot are replaced.

Step 3: An evaluation value is calculated and the pattern is stored when the evaluation value is improved.

Steps 1 to 3 are repeated.

The method is not limited to that described in "Example 1" and the methods illustrated in FIGS. 14B and 14C may be used.

The low-frequency filter and the PSF which are applied to each gradation are changed so as to change the degree of suppression of the low-frequency component in the sheet transportation direction. For example, the evaluation filter is further isotropically configured (for example, as illustrated in FIG. 20A or FIG. 20B, isotropy is obtained by the PSF (real space) or each component of an isotropic low-frequency filter increases so as to reduce the weight of an anisotropic PSF) to reduce the degree of suppression of the low-frequency component in the sheet transportation direction.

[Example 2 of Threshold Matrix Creation Method]

A method can be used which a bandpass filter is applied to white noise and then determines the arrangement of threshold values using a binarized pattern as a candidate of the dot array (that is, as the above-mentioned "constraint condition 2").

When the method disclosed in JP4143560B is applied, it is possible to create a threshold matrix having pattern characteristics (characteristics that the low-frequency component in the sheet transportation direction is suppressed) for the purpose described with reference to FIGS. 9 to 12. That is, the frequency characteristics described with reference to FIG. 9 to FIG. 12, in which low-frequency component in the sheet transportation direction are suppressed, are applied to the white noise pattern and the pattern is binarized. Then, the region of the pattern is used as a candidate of the dot array. In this way, it is possible to generate a threshold matrix with the above-mentioned pattern characteristics. In this example, whether or not to apply the above-mentioned constraint condition is determined for each gradation to change the above-mentioned characteristics.

[Example 3 of Threshold Matrix Creation Method]

A method can be used which determines a dot array in a sub-matrix in which a low-frequency component in the raster direction is suppressed such that the number of dots in each sub-matrix is maintained.

Figure 18:
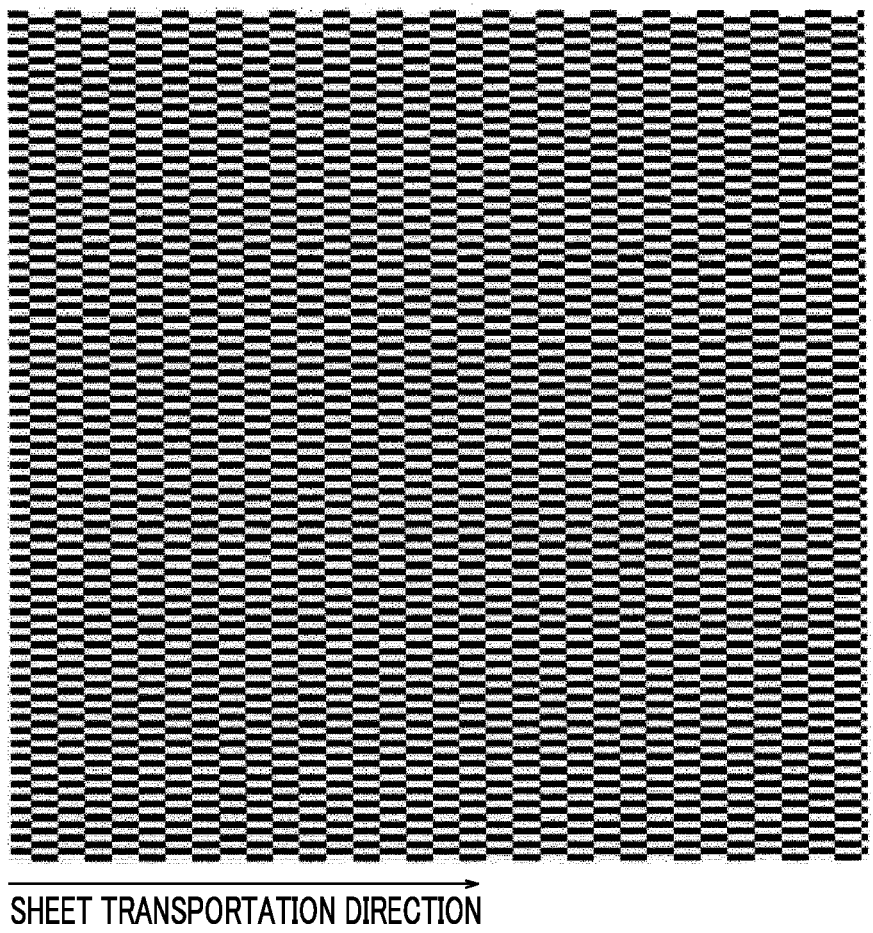
FIG. 18 is a diagram illustrating an example of a sub-matrix in which a frequency component in the sheet transportation direction is suppressed.

A sub-matrix with characteristics in which a low-frequency component in the sheet transportation direction is suppressed is prepared and a dot array is determined while maintaining the number of dots in the sub-matrix. In this way, it is possible to determine the dot array while maintaining the characteristics of the sub-matrix. Therefore, it is possible to maintain suppression characteristics at each gradation. For example, a sub-matrix having the shape illustrated in FIG. 18 can be used.

<For Quantization Method Using Threshold Matrix According to the Embodiment>

Figure 19:
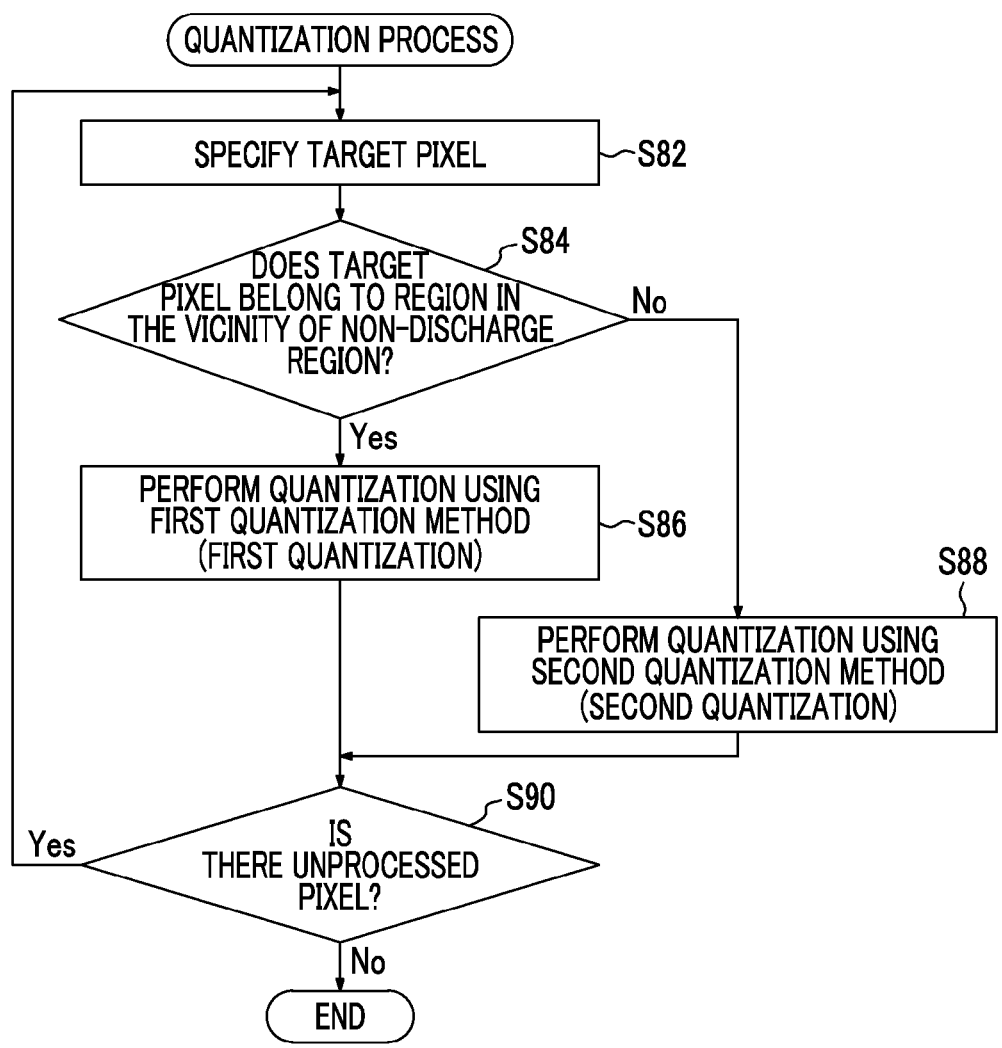
FIG. 19 is a flowchart illustrating the flow of a quantization process according to the embodiment.

Next, a quantization method according to the embodiment will be described. FIG. 19 is a flowchart illustrating the flow of a quantization process according to the embodiment. The flow illustrated in FIG. 19 corresponds to the quantization process of Step S20 in FIG. 1. In the quantization process according to the embodiment, different quantization methods are applied to a region (which corresponds to a "first image region") in the vicinity of a non-discharge region, which includes a pixel row corresponding to a masked non-discharging nozzle and pixel rows adjacent to the pixel row, and the other regions (hereinafter, referred to as a "normal region", which corresponds to a "second image region"). The quantization method applied to the region in the vicinity of the non-discharge region is referred to as a first quantization method and the quantization method applied to the normal region is referred to as a second quantization method.

When the quantization process illustrated in FIG. 19 starts, first, the pixel to be subjected to the quantization process is specified based on image data (Step S82 in FIG. 19). Then, it is determined whether the target pixel (pixel of interest) belongs to the region in the vicinity of the non-discharge region (Step S84).

When the target pixel belongs to the region in the vicinity of the non-discharge region, quantization (first quantization) is performed through the first quantization method (Step S86, which corresponds to a "first quantization step"). On the other hand, when it is determined in Step S84 that the target pixel belongs to the normal region, the process proceeds to Step S88 and quantization (second quantization) is performed for the target pixel through the second quantization method (which corresponds to a "second quantization step").

After the target pixel is quantized in Step S86 or S88, it is determined whether there is an unprocessed pixel (Step S90). When it is determined in Step S90 that there is an unprocessed pixel, the process returns to Step S82 and the next pixel to be processed is specified and the above-mentioned process (Steps S82 to S90) is repeated.

When the quantization process for all of the pixels in the image data is completed and it is determined in Step S90 that there is no unprocessed pixel, this process ends.

Examples of the first quantization and the second quantization described in Steps S86 and S88 of FIG. 19 will be described.

(1) Method Using Plural Threshold Matrices

An example in which different threshold matrices are used for the region in the vicinity of the non-discharge region and the other regions (which are referred to as a "normal region") when the quantization process is performed will be described. A first threshold matrix using the first quantization and a second threshold matrix using the second quantization are both generated with reference to a common pattern having the spatial frequency characteristics (the pattern characteristics (suppression characteristics) in which the low-frequency component in the sheet transportation direction is suppressed, which correspond to a "first pattern characteristic") described with reference to FIGS. 9 to 12. The common pattern is, for example, a quantization pattern indicating a uniform concentration image with a reference specific halftone (reference gradation $L_b$). This pattern is referred to as a "common pattern" or a "reference pattern". An appropriate value can be selected as the reference gradation $L_b$. When the maximum gradation is 100%, it is preferable to select a gradation which is about 50% of the maximum gradation. It is more preferable to select a gradation that slightly deviates from 50% of the maximum gradation.

In the first threshold matrix used in the region in the vicinity of the non-discharge region, the suppression characteristics are maintained at a large number of gradations (in a wide gradation region), as compared to the second threshold matrix used in the normal region. That is, in the second threshold matrix, the suppression characteristics are maintained in a gradation region (which is equal to or greater than a gradation $L_c$ and equal to or less than a gradation $L_d$) which is defined by the gradation $L_c$ below the reference gradation $L_b$ and the gradation $L_d$ above the reference gradation $L_b$. In contrast, in the first threshold matrix, the suppression characteristics are maintained in a wide gradation region (which is equal to or greater than a gradation $L_e$ and equal to or less than a gradation $L_f$) which is defined by the gradation $L_e$ ($L_e < L_c$) below the gradation $L_c$ and the gradation $L_f$ ($L_d \leq L_f$) equal to or greater than the gradation $L_d$. These threshold matrices can be implemented by changing the evaluation function when each gradation pattern is generated.

In the gradation region which is defined by a range (domain) from a minimum gradation value Lmin to a maximum gradation value Lmax, the values of the reference gradation $L_b$ and the gradations $L_c$, $L_d$, $L_e$, and $L_f$ can be appropriately set so as to satisfy the following relationship: Lmin≤$L_e$<$L_c$<$L_b$<$L_d$≤$L_f$≤Lmax.

A gradation region (which is equal to or greater than the gradation $L_c$ and equal to or less than the gradation $L_d$) in which the first threshold matrix and the second threshold matrix maintain the suppression characteristics corresponds to a "first gradation region". A gradation region (which is equal to or greater than the gradation $L_e$ and less than the gradation $L_c$ or which is greater than the gradation $L_d$ and equal to or less than the gradation $L_f$) in which only the first threshold matrix maintains the suppression characteristics corresponds to a "second gradation region".

[Example of Process of Generating Each Threshold Matrix from Common Pattern]

Basically, each gradation pattern (dot array) is generated by the same method as that used for the common pattern and the values of cells in the threshold matrix are determined from each gradation pattern to generate the threshold matrix.

When the common pattern (reference initial gradation pattern) is determined, there is no restriction on the relationship with the array of dots with different gradation values since the array of dots with different gradation values has not been determined. In contrast, when the array of dots with different gradation values is determined on the basis of the common pattern, there is the same constraint condition (the constraint condition that the position where a dot is generated depends on the gradation patterns before and after the position) as the constraint condition (stacking constraint) in the general dither generation process.

For a gradation requiring the same characteristics as those in the common pattern, for example, the PSF described with reference to FIG. 17 is used to generate a pattern. For the other gradations, for example, a more isotropic PSF is used.

For example, an isotropic PSF illustrated in FIG. 20A or FIG. 20B can be used as a PSF which is more isotropic than the PSF illustrated in FIG. 17.

The isotropic PSFs illustrated in FIGS. 20A and 20B are used to obtain a dot array (quantization pattern) with an isotropic pattern characteristic (which corresponds to a "second pattern characteristic").

(2) Method Using Both Dither and Error Diffusion

Similarly to "(1) Method Using Plural Threshold Matrices", a plurality of threshold matrices are used and a quantization error is diffused to neighboring pixels which have not been processed to further improve granularity. A processing algorithm is the same as that in the existing technique except that the threshold matrices used for the normal region and the region in the vicinity of the non-discharge region are switched. For example, an error diffusion matrix illustrated in FIG. 21 and the flow of a quantization process illustrated in FIG. 22 can be used.

Figure 21:
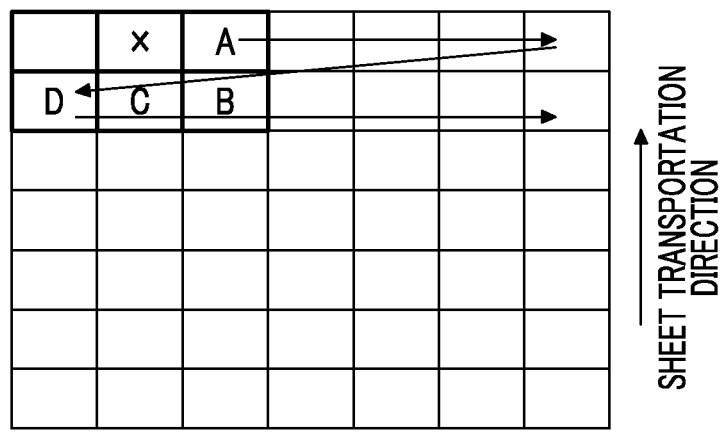
FIG. 21 is a diagram illustrating an example of an error diffusion matrix.

FIG. 21 illustrates an example of the error diffusion matrix. In FIG. 21, "x" indicates the position of a quantization target pixel and an arrow indicates the order of the quantization process. A quantization error is distributed to four unprocessed pixels (pixels on the right side, the lower right side, and the lower left side of the quantization target pixel and a pixel immediately below the quantization target pixel) adjacent to the pixel of interest (quantization target pixel x). Among components A to D of the error diffusion matrix for defining an error diffusion ratio, an error component ("A" in FIG. 21) which is diffused in the horizontal direction preferably has a value greater than a value when the error components are uniformly diffused (for example, the value of the error is divided by 4 and the distribution ratio of each error component is ¼). That is, in FIG. 21, it is preferable that the component "A" has a value greater than 0.25. As such, when a larger amount of quantization error is distributed in the horizontal direction (x direction), dots are dispersed in the horizontal direction. Therefore, dispersibility is improved overall and granularity is improved.

<Example of Flowchart of Quantization Process>

Figure 22:
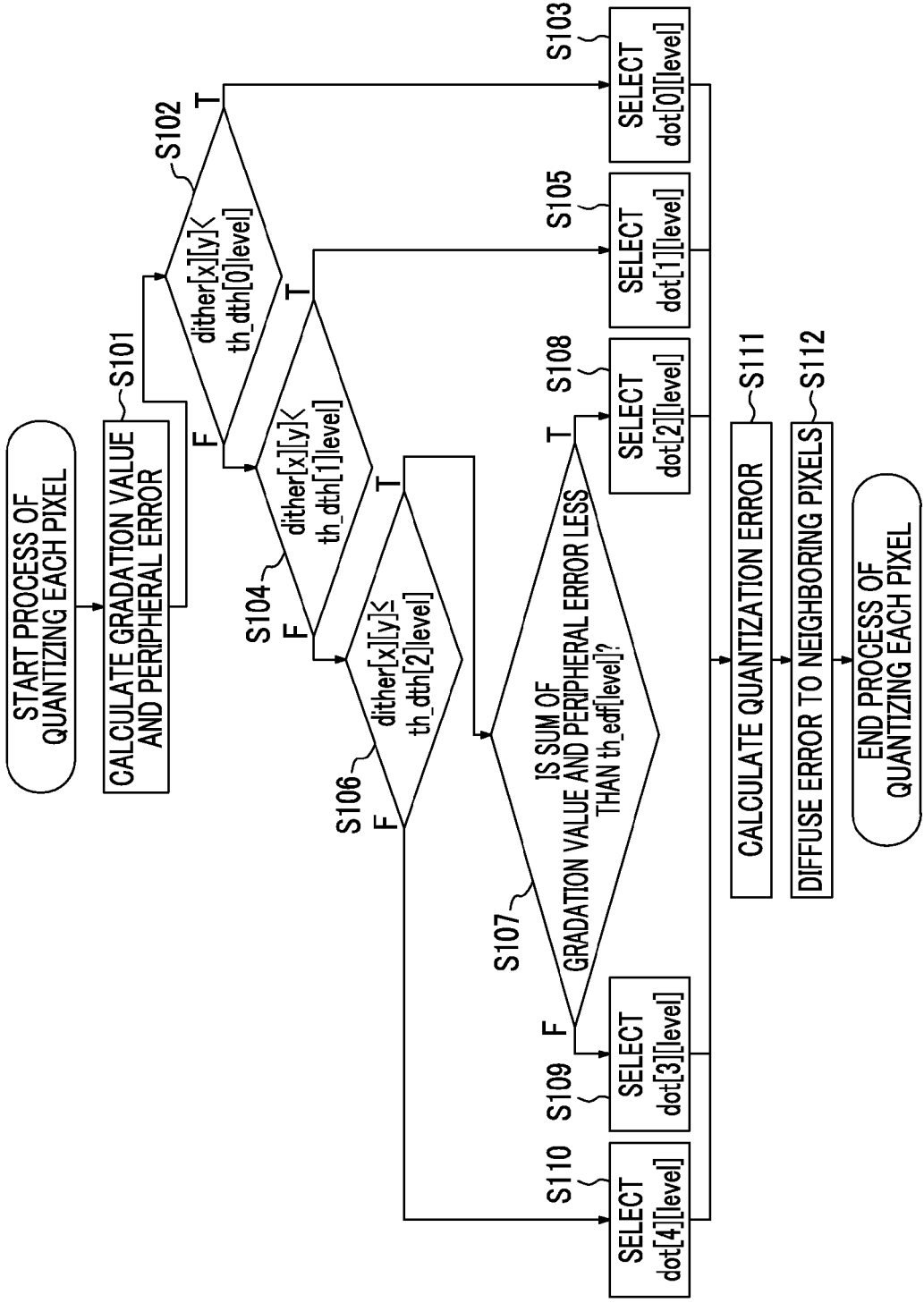
FIG. 22 is a flowchart illustrating an example of a quantization process using both a threshold matrix and error diffusion.

Here, an example of the quantization process using both the dither matrix (which is synonymous with a "threshold matrix") and the error diffusion method will be described. FIG. 22 is a flowchart illustrating the quantization process for each pixel. In FIG. 22, dither[x][y] indicates components of a two-dimensional dither matrix. In addition, th_dth[i][level] indicates a threshold value compared with the dither matrix (i=0, 1, 2) and th_edf[level] indicates an error diffusion threshold value. Furthermore, dot[j][level] corresponds to any one of the dot sizes {no droplet, a small droplet, a medium droplet, a large droplet} for each gradation value (level) (j=0, 1, 2, 3).

When the quantization process for each pixel starts, first, the sum of the original gradation value of a target pixel and a peripheral error which is diffused to the target pixel by error diffusion is calculated to compute a gradation value including the peripheral error (Step S101).

Then, the value (dither[x][y]) of the dither matrix is compared with the threshold value th_dth[i][level] to divide the region of the image. The threshold value th_dth[i][level] is set for each gradation value (level) of the target pixel and is stored in a predetermined memory in advance. The image is divided into four regions, using a first threshold value th_dth[0][level], a second threshold value th_dth[1][level], and a third threshold value th_dth[2][level].

First, the value of the dither matrix is compared with the first threshold value th_dth[0][level] (Step S102). As a result of the comparison, when the value of the dither matrix is less than the first threshold value, the dot size designated by dot [0][level] is selected (Step S103).

In Step S102, when the value of the dither matrix is equal to or greater than the first threshold value, the value of the dither matrix is compared with the second threshold value th_dth[1][level] (Step S104). As a result of the comparison, when the value of the dither matrix is less than the second threshold value, the dot size designated by dot[1][level] is selected (Step S105).

In Step S104, when the value of the dither matrix is equal to or greater than the second threshold value, the value of the dither matrix is compared with the third threshold value th_dth[2][level] (Step S106). When the value of the dither matrix is equal to or less than the third threshold value th_dth [2][level], the process proceeds to Step S107 and the gradation value including the peripheral error is compared with the error diffusion threshold value th_edf[level] (Step S107). The error diffusion threshold value th_edf[level] is also set for each gradation value of the target pixel and is stored in a predetermined memory in advance. As a result of the comparison in Step S107, when the gradation value including the peripheral error is lower than the error diffusion threshold value, the dot size designated by dot[2][level] is selected (Step S108).

On the other hand, in Step S107, when the gradation value including the peripheral error is equal to or greater than the error diffusion threshold value, the dot size designated by dot[3][level] is selected (Step S109).

As such, a binarization process is performed by the error diffusion method in the region in which the value of the dither matrix is equal to or less than the third threshold value (and equal to or greater than the second threshold value).

In Step S106, when the value of the dither matrix is greater than then third threshold value, the dot size designated by dot[4] [level] is selected (Step S110).

The dot size of each dot[j][level] is appropriately determined for each gradation value. For example, for a given gradation value, dot[0][level] can be determined to be a small droplet, dot[1][level] can be determined to be a medium droplet, dot[2][level] can be determined to be "no droplet", dot[3][level] can be determined to be a large droplet, and dot[4][level] can be determined to be a large droplet. Basically, the following relationship may be satisfied: dot[3][level]>dot[2][level]. Each value is determined such that a large dot is formed when the amount of quantization error is large and a small dot is formed when the amount of quantization error is small.

The first threshold matrix is used for quantization when the target pixel belongs to the region in the vicinity of the non-discharge region. The second threshold matrix is used for quantization when the target pixel belongs to the normal region. After the dot size of the target pixel is selected in this way, a quantization error is calculated (Step S111). The quantization error occurs when the gradation value including the peripheral error is quantized and is the difference between the gradation value including the peripheral error and a quantization threshold value. The quantization threshold value is a gradation value which is associated with each dot[0][level], that is, dot[1][level], dot[2][level], dot[3][level], and dot[4][level].

The calculated quantization error is diffused to the neighboring pixels according to a predetermined error diffusion matrix (Step S112). Then, the quantization target pixel changes to adjacent pixels and the same process described above is performed to quantize all of the pixels.

According to the above-mentioned quantization process, the recording rate of dot[0][level], dot[1][level], and dot[4][level] in each region corresponding to Steps S103, S105, and S110 is determined by the dither matrix. The error rate in the remaining region is determined by binarization using the error diffusion method (Steps S108 and S109). This quantization process makes it possible to uniquely determine the recording ratio of four values for each gradation.

In this example, the threshold value of the original gradation value of the target pixel is used as each threshold value th_dth[i][level]. However, the threshold value of the gradation value including the peripheral error may be used.

(3) Dither/Error Diffusion Method Using Common Threshold Matrix in Region in Vicinity of Non-Discharge Region and Other Regions (Normal Region)

The same process as that in the flowchart of FIG. 22 is used as a dither/error diffusion algorithm using a common threshold matrix in the normal region and the region in the vicinity of the non-discharge region. In the "common threshold matrix", the pattern characteristics in which the low-frequency component in the sheet transportation direction is suppressed are maintained in a relatively wide gradation region (for example, gradation values Lmin to $L_f$) up to a gradation with a small number of dots (see FIG. 23).

For the gradation with a small number of dots (for example, a gradation that is equal to or greater than the gradation Lmin and less than the gradation $L_c$ on the highlight side), the quantization process is performed with reference to the gradation with a small number of dots in the threshold matrix (the threshold value of the matrix) in the region in the vicinity of the non-discharge region. In addition, in the normal region, the quantization process (binarization or multi-value conversion) is performed using the error diffusion method, with reference to the threshold matrix pattern (the dot array implemented by the threshold matrix) of a gradation (for example, the reference gradation $L_b$ or a gradation with a value close to the reference gradation $L_b$) close to the common pattern, under the constraint condition in which dots are arranged in the threshold matrix pattern. The "gradation with a value close to the reference gradation $L_b$" means a gradation range having a dot distribution form that is so close to that of the reference gradation that it can be used as a dot array constraint condition.

For a gradation with a large number of dots (for example, a gradation equal to or greater than the gradation $L_c$), the quantization is performed with reference to the threshold value of the threshold matrix in both the normal region and the region in the vicinity of the non-discharge region.

Figure 23:
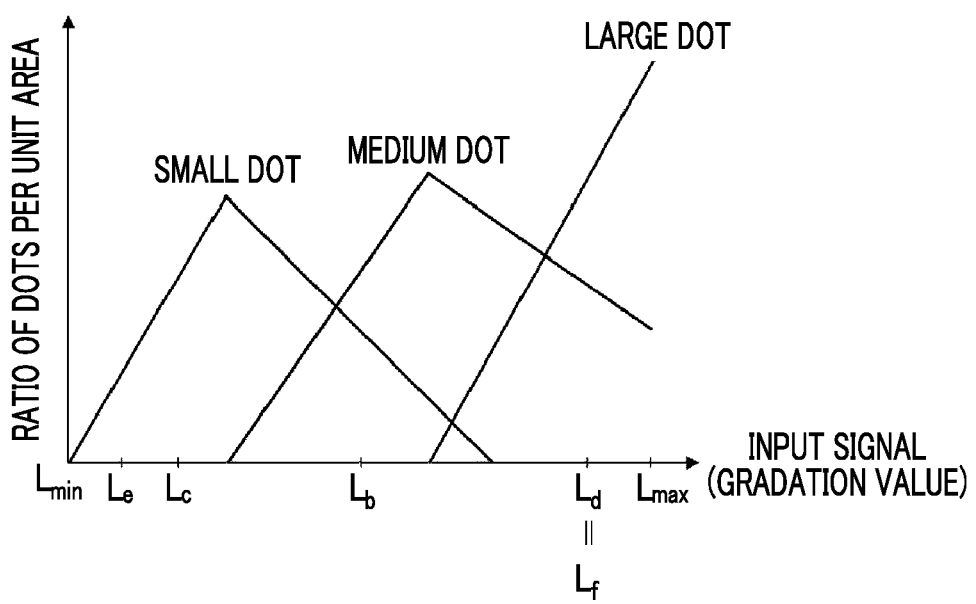
FIG. 23 is a graph illustrating the ratio of each type of dot obtained by the quantization process.

FIG. 23 illustrates the ratio of each type of dot in a halftone pattern which is implemented by the common threshold matrix. The horizontal axis indicates an input signal value (gradation value) and the vertical axis indicates the recording ratio (dot ratio) of small ink dots, medium ink dots, and large ink dots per unit area. For example, in FIG. 23, the vertical axis indicates the ratio of the number of large, medium, and small ink dots discharged to a pixel region (which corresponds to a "unit area") in which ink droplets corresponding to a maximum of 100 pixels can be discharged. The use ratio of various types of dots with respect to the input signal value can be appropriately designed by the detailed setting of the quantization method.

In the example illustrated in FIG. 23, the quantization process using the error diffusion method is performed on the highlight side (which is equal to or less than the gradation $L_c$) in the normal region. Therefore, the dots in the normal region can be substantially isotropically arranged in the gradation region in which dots are sparsely arranged.

<Advantages of Image Processing Method According to the Embodiment>

(1) The quantization method based on the common pattern in which low-frequency components among spatial frequency components in the sheet transportation direction (that is, the direction in which the recording medium is moved relative to the recording head) are suppressed is used for the region in the vicinity of the non-discharge region and the other regions, that is, the normal region. Therefore, the continuity of the pattern is maintained between the region in the vicinity of the non-discharge region and the other regions, that is, the normal region. In this pattern, the spatial frequency components in the sheet transportation direction (direction parallel to streaks) are suppressed. Therefore, even when a large number of nozzles are defective, no artifact is generated and it is possible to perform high-quality correction.

(2) Different quantization methods are performed in the region in the vicinity of the non-discharge region and the other regions, that is, the normal region. In the quantization process applied to the region in the vicinity of the non-discharge region, the suppression characteristics are maintained in a wider gradation region than those in the quantization process applied to the normal region. Since different quantization methods are performed in the region in the vicinity of the non-discharge region and the other regions, that is, the normal region, granularity is not reduced even in the normal region. In addition, since the suppression characteristics are also satisfied in the region in the vicinity of the non-discharge region, no artifact is generated.

(3) According to the embodiment, it is possible to suppress the generation of an artifact due to pattern defects caused by the masking of an abnormal nozzle, using both concentration correction (unevenness correction) and the quantization process. In addition, different quantization methods are applied to the region in the vicinity of the non-discharge region and the normal region and an appropriate quantization process can be performed for each of the regions. Therefore, granularity is not reduced even in the normal region. According to the embodiment, it is possible to achieve the suppression of an artifact and the suppression of a reduction in granularity in the normal region.

Figure 24:
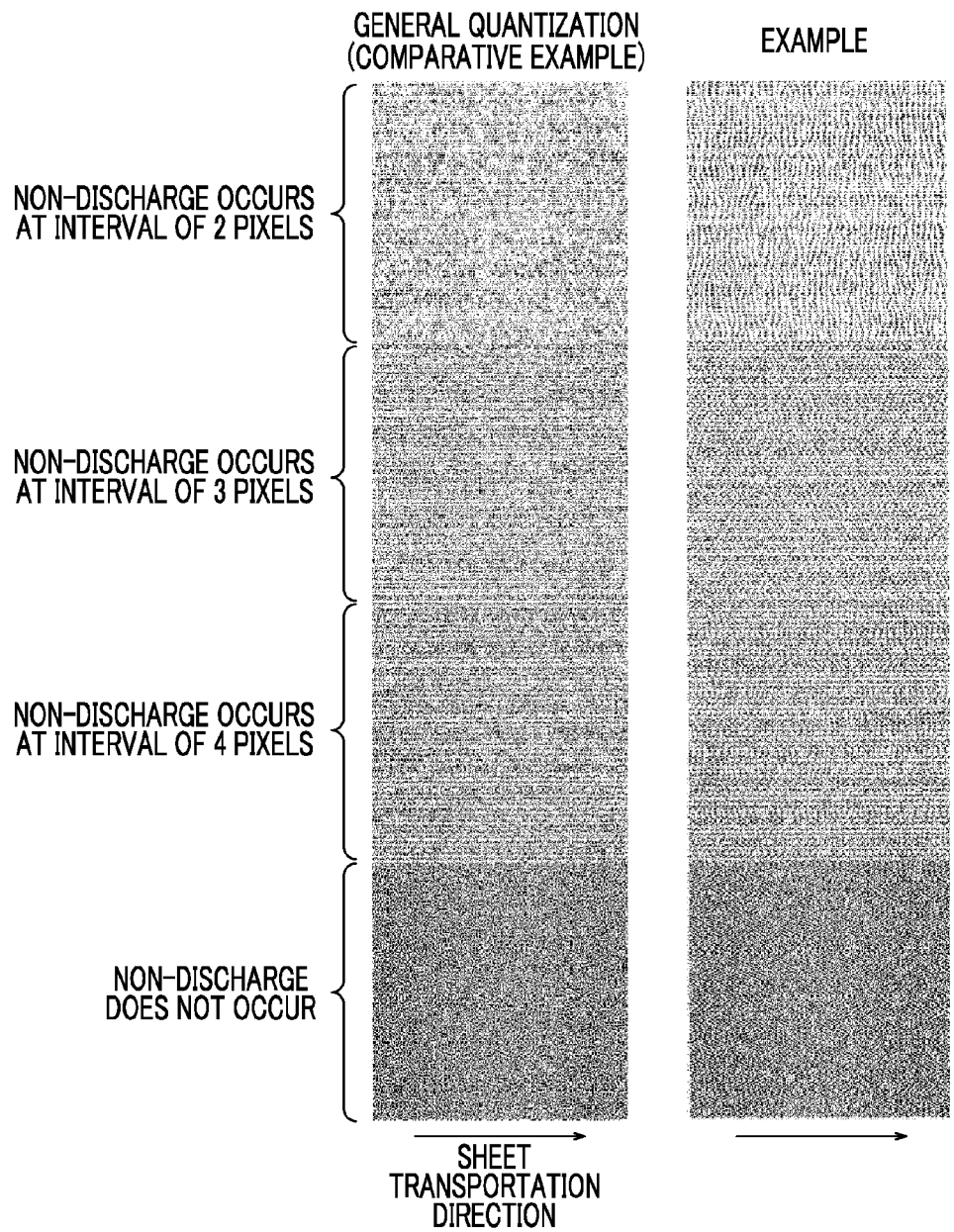
FIG. 24 is a diagram illustrating a general quantization pattern (comparative example) and a quantization pattern (example) according to the embodiment in contrast with each other.

FIG. 24 illustrates the operation and effects of the embodiment. FIG. 24 illustrates the quantization pattern (comparative example) obtained by the method according to the related art and the quantization pattern (example) obtained by the image processing according to the embodiment in contrast with each other. Here, a uniform image with the reference gradation $L_b$ is used as the input gradation value.

FIG. 24 sequentially illustrates a pattern when non-discharge (nozzle defect) occurs at an interval of 2 pixels, a pattern when non-discharge (nozzle defect) occurs at an interval of 3 pixels, a pattern when non-discharge (nozzle defect) occurs at an interval of 4 pixels, and a pattern when non-discharge does not occur from the top to the bottom. In the general quantization process (comparative example) illustrated on the left side of FIG. 24, when there is a non-discharging nozzle in the recording head, voids (streaks) occur and granularity is significantly reduced.

In contrast, in this example (the right side of FIG. 24), even though there are a large number of non-discharging nozzles, voids in the pattern are uniform and an artifact is not generated at any interval (intervals of 2 pixels to 4 pixels) of nozzle defects illustrated in FIG. 24.

FIG. 24 illustrates the case of non-discharge (nozzle defect). However, the same effect is obtained for an artifact when concentration correction is performed for concentration unevenness other than non-discharge. Since the amplitude of shading in streaks caused by non-discharge is greater than that in concentration unevenness other than non-discharge, an artifact is likely to be generated in the streaks caused by non-discharge. Therefore, according to the embodiment, in addition to the effect of suppressing the artifact caused by non-discharge, the effect of suppressing the artifact caused by concentration unevenness other than non-discharge is obtained.

<Example of Structure of Image Processing Device>

Next, an example of the structure of a device for implementing the above-mentioned image processing method will be described.

Figure 25:
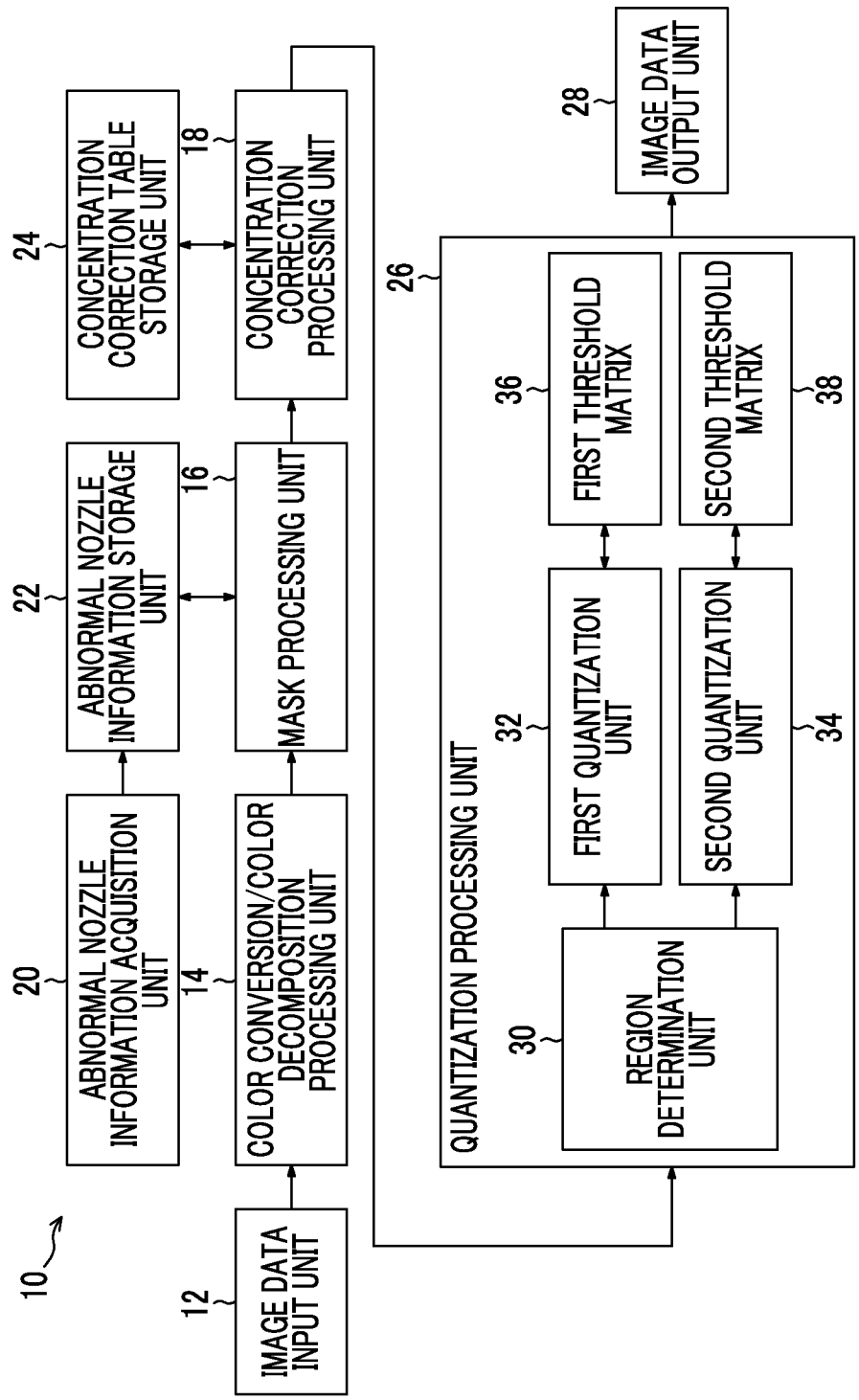
FIG. 25 is a block diagram illustrating an example of the structure of an image processing device according to the embodiment.

FIG. 25 is a block diagram illustrating an example of the structure of an image processing device according to the embodiment. Here, an example in which quantization is performed using a plurality of threshold matrices (a first threshold matrix 36 and a second threshold matrix 38) will be described. An image processing device 10 according to the embodiment includes an image data input unit 12, a color conversion/color decomposition processing unit 14, a mask processing unit 16 (which corresponds to "a mask processing unit"), a concentration correction processing unit 18 (which corresponds to "an image correction unit"), an abnormal nozzle information acquisition unit 20 (which corresponds to "a defect information acquisition unit"), an abnormal nozzle information storage unit 22, a concentration correction table storage unit 24, a quantization processing unit 26 (which corresponds to "a quantization processing unit"), and an image data output unit 28. The quantization processing unit 26 includes a region determination unit 30 which determines the region of the pixel to be processed, a first quantization unit 32 (which corresponds to "a first quantization unit"), and a second quantization unit 34 (which corresponds to "a second quantization unit"). The first quantization unit 32 is a unit quantizing a pixel in the region in the vicinity of the non-discharge region and performs quantization with reference to the first threshold matrix 36 (which corresponds to a "first quantization method"). The second quantization unit 34 is for a unit quantizing a pixel in the normal region other than the region in the vicinity of the non-discharge region and performs quantization with reference to the second threshold matrix 38 (which corresponds to a "second quantization method"). The characteristics of the first threshold matrix 36 and the second threshold matrix and the content of the quantization process are the same as those described with reference to, for example, FIGS. 9 to 22.

The image data input unit 12 illustrated in FIG. 25 functions as a data acquisition unit for acquiring image data. The image data input unit 12 can be a data input terminal for acquiring image data from the outside or another signal processing unit in the device. In addition, the image data input unit 12 may be a wired or wireless communication interface unit or a media interface unit that reads and writes data from and to an external storage medium (removable disk), such as a memory card. Alternatively, these aspects may be appropriately combined with each other.

The image data (reference numeral D10 in FIG. 1) input from the image data input unit 12 is transmitted to the color conversion/color decomposition processing unit 14 and is decomposed into a gradation image having the same type of colors, the same number of colors, and the same resolution as ink colors which are used in an inkjet recording device as an output machine. For example, in the case of an inkjet recording device that achieves an output resolution of 1200 dpi using inks of four colors, that is, C, M, Y, and K, 8-bit (256 gradations) image data is obtained for each of C, M, K, and Y.

Image data for the image to be printed may have various formats. When image data specified by a color combination and a resolution format that are different from the type of ink color and resolution used in the inkjet recording device is treated, the following structure may be used, instead of the structure in which the color conversion/color decomposition processing unit 14 performs color conversion or resolution conversion or in combination with this structure. Specifically, in a stage before the image data input unit 12, a preprocessor (not illustrated) may perform color conversion or resolution conversion to convert the image data into image data with ink colors and resolution that are used in the inkjet recording device. Then, the converted image data may be input from the image data input unit 12.

For example, when the original image data is RGB image data, a raster image processor (RIP) device can perform a color conversion process of converting R, and B into C, M, Y, and K and a resolution conversion process to convert the RGB image data into CMYK image data (input image data) suitable for the inkjet recording device. Then, the converted data can be input into the image data input unit 12.

The mask processing unit 16 masks an abnormal nozzle (such that the abnormal nozzle does not discharge ink or is unusable) on the basis of abnormal nozzle information stored in the abnormal nozzle information storage unit 22. The abnormal nozzle information is acquired from the abnormal nozzle information acquisition unit 20 and is then stored in the abnormal nozzle information storage unit 22. The abnormal nozzle information acquisition unit 20 can include an abnormal nozzle detection unit that reads the print result of a test pattern and detects the position of the abnormal nozzle on the basis of the print result. In addition, the abnormal nozzle information acquisition unit 20 may include a reading device (for example, a scanner or a concentration meter) which reads the print result of the test pattern. Alternatively, the abnormal nozzle information acquisition unit 20 may be a data input interface for acquiring, as data, information about the abnormal nozzle detected from the measurement result of the test pattern.

The concentration correction processing unit 18 has a function of generating a concentration correction table and a correction function of performing image correction using the concentration correction table. The concentration correction table generated by the concentration correction processing unit 18 is stored in the concentration correction table storage unit 24. The concentration correction processing unit 18 performs concentration correction for the image data subjected to a mask process, using the concentration correction table.

The image data corrected by the concentration correction processing unit 18 is transmitted to the quantization processing unit 26. Different quantization methods are applied to the region in the vicinity of the non-discharge region and the normal region and quantization is performed.

Dot data generated by the quantization processing unit 26 is output from the image data output unit 28. The image data output unit 28 can be a data output terminal for outputting the image data to the outside or another signal processing unit in the device. In addition, the image data output unit 28 may be a wired or wireless communication interface unit or a media interface unit that reads and writes data from and to an external storage medium (removable disk), such as a memory card. Alternatively, these aspects may be appropriately combined with each other.

The first quantization unit 32 and the second quantization unit 34 can be formed by combining the threshold matrix and an error diffusion unit, as described with reference to FIGS. 21 and 22. In addition, the second quantization unit 34 can use the error diffusion method, which has the threshold matrix pattern as a constraint condition, in the normal region for the gradation with a small number of dots, with reference to the first threshold matrix 36 and the common threshold matrix, as described with reference to FIG. 23, instead of using the second threshold matrix 38.

The functions of each unit in the image processing device 10 according to the embodiment illustrated in FIG. 25 can be implemented by hardware, such as an integrated circuit, software (program) for operating a central processing unit (CPU), or an appropriate combination thereof.

That is, the functions of each unit in the image processing device 10 according to the embodiment or each process of the image processing method according to the embodiment which have been described with reference to, for example, FIGS. 1, 2, 19, and 22 can be executed by a computer. A program that causes the computer to execute the processing functions according to the embodiment may be installed in the computer in advance, or the functions may be provided by a magnetic disk, an optical disc, a magneto-optical disk, a memory card, and other computer-readable recording media (information storage media) that store the program. In addition, instead of the aspect in which the program is stored in a tangible object, such as a storage medium, and is then provided, program signals may be provided as a download service through a communication network such as the Internet.

Figure 26:
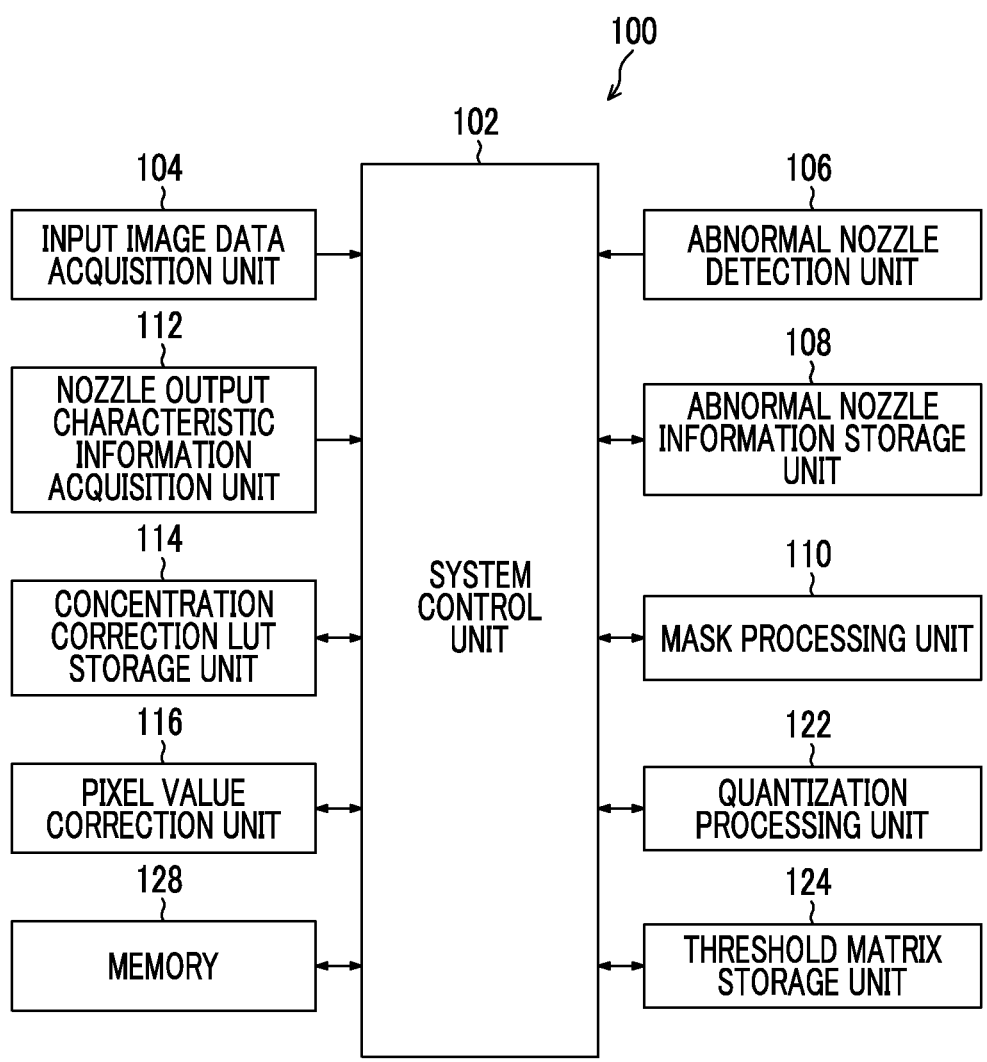
FIG. 26 is a block diagram illustrating an example of the structure of an image processing device according to another embodiment.

FIG. 26 is a block diagram illustrating an example of the structure of an image processing device according to another embodiment. An image processing device 100 illustrated in FIG. 26 can be applied to an image processing unit which generates an output image (halftone image) from input image data in the inkjet recording device. The image processing device 100 includes a system control unit 102 that controls the overall operation of the device, an input image data acquisition unit 104 that acquires input image data, an abnormal nozzle detection unit 106 that detects an abnormal nozzle of an inkjet head (not illustrated), an abnormal nozzle information storage unit 108 that stores abnormal nozzle information, and a mask processing unit 110 (a mask processing unit) that masks the abnormal nozzle.

In addition, the image processing device 100 includes a nozzle output characteristic information acquisition unit 112 that acquires output characteristic information of each nozzle, a concentration correction LUT storage unit 114 that stores the acquired nozzle output characteristic information in the form of a lookup table for each nozzle, and a pixel value correction unit 116 (which corresponds to "an image correction unit") that corrects the value of each pixel with reference to the concentration correction LUT.

The concentration correction LUT storage unit 114 is a storage unit that stores the concentration correction table D18 described with reference to FIG. 1 and corresponds to the concentration correction table storage unit 24 illustrated in FIG. 25.

The image processing device 100 illustrated in FIG. 26 further includes a quantization processing unit 122 (a quantization processing unit) that performs a quantization process for the image data whose concentration has been corrected by the pixel value correction unit 116, a threshold matrix storage unit 124 that stores a threshold matrix used for the quantization process, and a memory 128. The memory 128 is used as a primary data storage area or an operation area of each unit. The quantization processing unit 122 corresponds to the quantization processing unit 26 described with reference to FIG. 25. Since each unit illustrated in FIG. 26 corresponds to each step of the image processing method described with reference to FIGS. 1 to 12, the description thereof will not be repeated here.

In addition, the image processing device 100 may include a parameter storage unit that stores various parameters or conversion tables used for the process (operation) of each unit of the device or a program storage unit that stores programs (software) used for the process (operation) of each unit of the device.

<For Structure of Image Forming Device According to the Embodiment>

Figure 27:
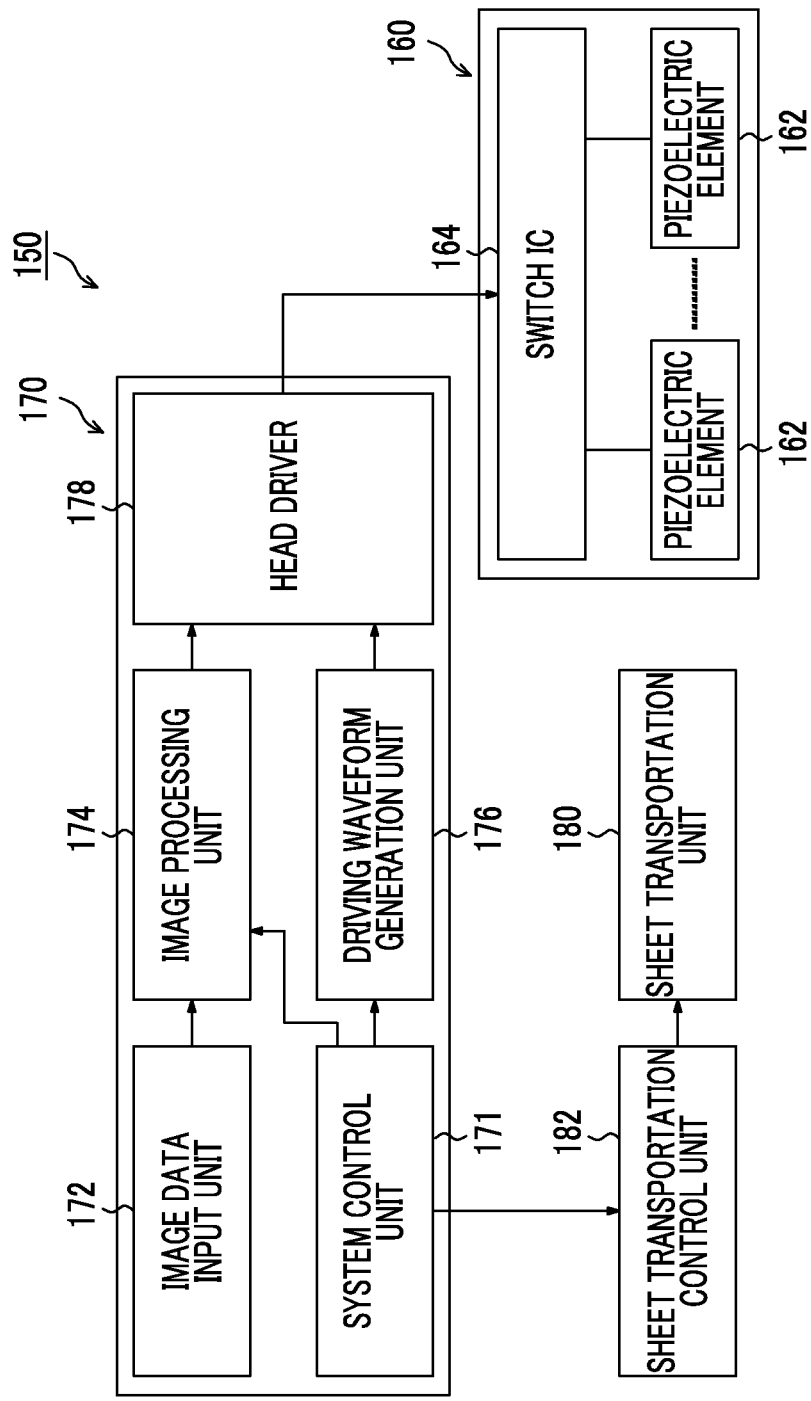
FIG. 27 is a block diagram illustrating the structure of a main portion of an image forming device according to an embodiment of the invention.

FIG. 27 is a block diagram illustrating the structure of a main portion of an image forming device according to the embodiment. An image forming device 150 includes a recording head 160, a control device 170 (which corresponds to "controller") that controls a recording operation of the recording head 160, and a sheet transportation unit 180 (which corresponds to "a relatively moving unit"). In FIG. 27, the recording head 160 corresponding to one color is illustrated for simplicity of illustration. However, the image forming device 150 includes a plurality of inkjet heads corresponding to a plurality of ink colors.

The detailed structure of the recording head 160 is not illustrated. However, the recording head 160 includes a plurality of piezoelectric elements 162 serving as discharge energy generation elements that generate discharge energy required to discharge ink from each corresponding nozzle and a switch IC 164 that switches on and off each piezoelectric element 162.

In the recording head 160, the number of nozzles, the density of the nozzles, and the array of the nozzles are not particularly limited. The nozzles may be arranged in various ways. For example, a one-dimensional nozzle array in which a large number of nozzles are arranged in a straight line (in a line) at regular intervals or a so-called zigzag array in which two nozzle rows are arranged such that the nozzles in each nozzle row are shifted by a pitch corresponding to half of the interval between the nozzles (the pitch between the nozzles) in a nozzle row direction may be used in order to obtain a predetermined recording resolution in the main scanning direction. In addition, in order to obtain a higher recording resolution, a large number of nozzles may be two-dimensionally arranged on an ink discharge surface (nozzle surface). For example, a matrix array in which three or more nozzle rows are arranged can be used.

In the case of an inkjet head having a two-dimensional nozzle array, it is considered that a projected nozzle row in which each nozzle in the two-dimensional nozzle array is projected (orthogonal projection) so as to be arranged in the width direction of the sheet (corresponding to the main scanning direction) is equivalent to a nozzle row in which nozzles are arranged substantially at regular intervals in the main scanning direction (the width direction of a medium) at a density that is capable of obtaining a predetermined recording resolution. The "regular intervals" mean that droplet discharge points recordable by the inkjet printing system are substantially at regular intervals. For example, the concept of "regular intervals" includes a case in which the interval between the nozzles is slightly changed in consideration of a manufacturing error or the movement of liquid droplets on a medium due to landing interference. When the projected nozzle row (also referred to as a "substantial nozzle row") is considered, the positions of the nozzles (nozzle numbers) can be associated with the projected nozzles in the order in which the projection nozzles are arranged in the main scanning direction. In the following description, a "nozzle position" indicates the position of a nozzle in the substantial nozzle array.

The control device 170 includes a system control unit 171, an image data input unit 172 that functions as an input interface unit for receiving the original image data of the image to be recorded (multi-tone image data), and an image processing unit 174 that performs concentration correction and a quantization process for input image data. The control device 170 further includes a driving waveform generation unit 176 and a head driver 178.

The content of the process of the image processing unit 174 is the same as that described with reference to, for example, FIGS. 1 to 26.

The image processing unit 174 is a signal processing unit converting input image data into binary or multi-value dot data. For example, the above-mentioned structure using the threshold matrix and the above-mentioned structure in which the threshold matrix and the error diffusion method are combined with each other can be applied as the quantization processing (halftone processing) unit.

In general, the quantization process converts M-level (M is an integer equal to or greater than 3) gradation image data into N-level (N is an integer equal to or greater than 2 or less than M) gradation image data. The simplest example is conversion into binary dot image data (on/off of dots). The quantization processing is also capable of quantizing multiple values corresponding to types of dot size (for example, three dot types, that is, a large dot, a medium dot, and a small dot).

Binary or multi-valued image data (dot data) generated by the image processing unit 174 is used as ink discharge control data (droplet discharge control data) for controlling the driving (on)/non-driving (off) of each nozzle and further the amount of droplets (dot size) in the case of multiple values.

The dot data (droplet discharge control data) generated by the image processing unit 174 is transmitted to the head driver 178. The ink discharge operation of the recording head 160 is controlled.

The driving waveform generation unit 176 is a unit generating a driving voltage signal waveform for driving the piezoelectric elements 162 corresponding to each nozzle of the recording head 160. The waveform data of the driving voltage signal is stored in storage unit, such as a ROM, in advance. The waveform data to be used is output if necessary. The signal (driving waveform) generated by the driving waveform generation unit 176 is supplied to the head driver 178. The signal output from the driving waveform generation unit 176 may be digital waveform data or an analog voltage signal.

In this example, the image forming device 150 uses a driving method which supplies a common driving power waveform signal to each piezoelectric element 162 of the recording head 160 through the switch IC 164 to turn on and off a switch element connected to the electrode of each piezoelectric element 162 at the discharge time of each nozzle, so that ink is discharged from the nozzle corresponding to each piezoelectric element 162. The recording head 160 discharges ink droplets on demand on the basis of a driving signal and a discharge control signal from the head driver 178.

A combination of the system control unit 171, the image data input unit 172, and the image processing unit 174 illustrated in FIG. 27 corresponds to an "image processing device".

The system control unit 171 controls the sheet transportation unit 180 through a sheet transportation control unit 182. Therefore, a sheet (recording medium) (not illustrated) is transported to the recording head 160. The sheet transportation control unit 182 and the sheet transportation unit 180 correspond to "a relatively moving unit".

<Application Example of Inkjet Recording Device>

Next, an example in which the above-mentioned image processing method and device are applied to the inkjet recording device (which corresponds to an "image forming device") will be described.

Figure 28:
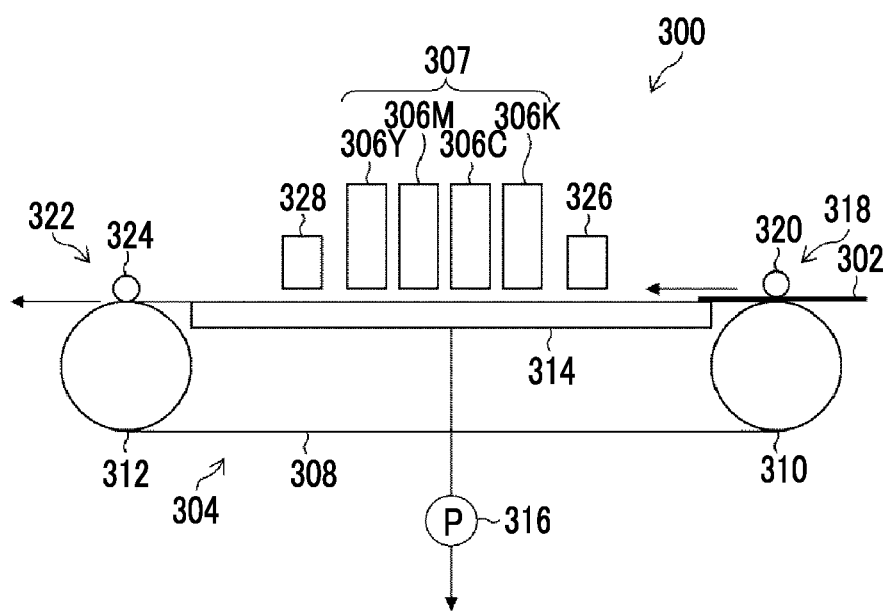
FIG. 28 is a diagram illustrating the overall structure of an inkjet recording device according to an embodiment.

FIG. 28 is a diagram illustrating the overall structure of an inkjet recording device according to an embodiment of the invention. An inkjet recording device 300 illustrated in FIG. 28 includes a recording medium transportation unit 304 that holds and transports a recording medium 302 (which corresponds to a "recording medium") and a printing unit 307 including inkjet heads 306K, 306C, 306M, and 306Y which discharge color ink of K, C, M, and Y to the recording medium 302 held by the recording medium transportation unit 304. The recording medium transportation unit 304 corresponds to "a relatively moving unit".

The recording medium transportation unit 304 includes an endless conveyance belt 308 in which a plurality of suction holes (not illustrated) are provided in a recording medium holding region holding the recording medium 302, a transportation roller (a driving roller 310 and a driven roller 312) around which the conveyance belt 308 is wound, a chamber 314 that is provided on the rear side of the conveyance belt 308 in the recording medium holding region (a surface opposite to a recording medium holding surface holding the recording medium 302) and is connected with the suction holes (not illustrated) provided in the recording medium holding region, and a vacuum pump 316 that causes a negative pressure in the chamber 314.

A pressure roller 320 for preventing the recording medium 302 from floating is provided in a carry-in unit 318 in which the recording medium 302 is carried. A pressure roller 324 is provided in a discharge unit 322 from which the recording medium 302 is discharged.

Negative pressure is applied from the suction holes provided in the recording medium holding region to the recording medium 302 carried in from the carry-in unit 318 and the recording medium 302 is sucked and held to the recording medium holding region of the conveyance belt 308.

On a transportation path of the recording medium 302, a temperature control unit 326 for controlling the surface temperature of the recording medium 302 within a predetermined range is provided in the stage before the printing unit 307 (on the upstream side of the printing unit 307 in the transportation direction of the recording medium) and a reading device 328 (reading sensor) that reads an image recorded on the recording medium 302 is provided in the stage after the printing unit 307 (on the downstream side of the printing unit 307 in the transportation direction of the recording medium).

The recording medium 302 carried in from the carry-in unit 318 is sucked and held to the recording medium holding region of the conveyance belt 308. Then, the temperature control unit 326 performs a temperature control process on the recording medium 302. Then, the printing unit 307 prints an image on the recording medium 302.

When the recording medium 302 is transported and passes immediately below the inkjet heads 306K, 306C, 306M, and 306Y, color ink of K, C, M, and Y is discharged onto the recording medium 302 and a desired color image is formed.

The printing unit 307 is not limited to the above-mentioned structure. For example, the printing unit 307 may include inkjet heads corresponding to ink of light cyan (LC), light magenta (LM), and other special colors. In addition, the order in which the inkjet heads 306K, 306C, 306M, and 306Y are arranged may be appropriately changed.

The reading device 328 reads the image (including the test pattern) recorded on the recording medium 302 having the image recorded by the printing unit 307 and the recording medium 302 is discharged from the discharge unit 322. The read result of the reading device 328 is used to determine a discharge failure in the inkjet heads 306K, 306C, 306M, and 306Y or to generate the concentration correction table.

Although not illustrated in FIG. 28, the inkjet recording device 300 includes an ink supply unit. The ink supply unit includes ink tanks, which store ink to be supplied to the inkjet heads 306K, 306C, 306M, and 306Y, for each color (for each head). The ink tanks for each color and the inkjet heads 306K, 306C, 306M, and 306Y are connected with each other by ink supply paths (not illustrated).

<Structure of Printing Unit>

Figure 29:
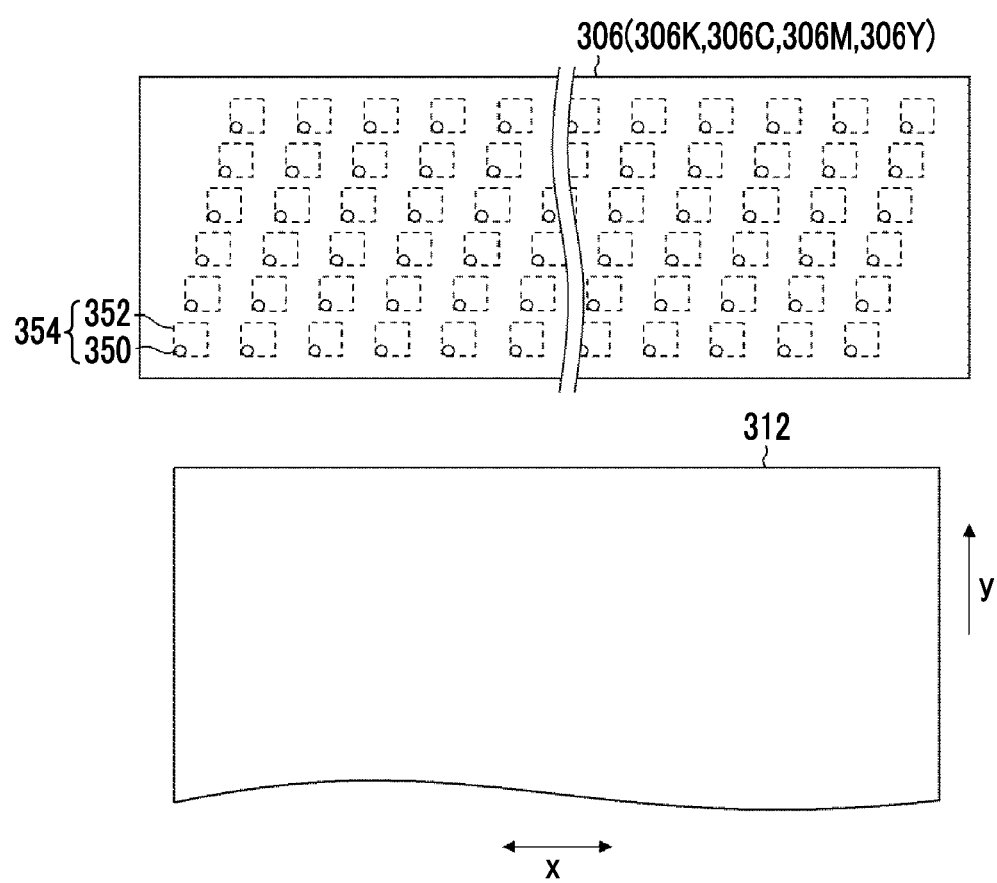
FIG. 29 is a perspective plan view illustrating an example of the structure of an inkjet head.

FIG. 29 is a perspective plane view (a perspective view seen from a surface opposite to an ink discharge surface) illustrating an example of the structure of the inkjet head. The same structure can be applied to the inkjet heads 306K, 306C, 306M, and 306Y of the printing unit 307. Therefore, in the following description, the inkjet heads are representatively denoted by common reference numeral 306.

As illustrated in FIG. 29, the inkjet head 306 is a page-wide full-line inkjet head in which a plurality of discharge elements (recording elements) 354 including nozzles 350 and pressure chambers 352 are arranged over a length corresponding to the full width of the recording medium 302 in the main scanning direction (x direction). A recording image can be recorded on the entire recording medium 302 by a single pass method which moves the full-line inkjet head 306 relative to the recording medium 302 only once.

The inkjet head 306 illustrated in FIG. 29 has a structure in which a plurality of nozzles 350 (discharge elements 354) are arranged in a matrix in a row direction along the main scanning direction (x direction) and an oblique column direction that is not orthogonal to a sub-scanning direction (y direction). As such, since a plurality of nozzles 350 are arranged in a matrix, the substantial density of the nozzles arranged in the main scanning direction (x direction) increases. In addition, the array of the nozzles in the inkjet head is not limited to the matrix array illustrated in FIG. 29.

Various discharge systems, such as a piezoelectric system that uses the flexural deformation of the piezoelectric element and a thermal system that uses a film boiling phenomenon of ink, can be applied to the inkjet head 306. The inkjet head 306 to which the piezoelectric system is applied includes a piezoelectric element 162 that is provided on at least one wall surface of the pressure chamber 352 connected with the nozzle 350.

The piezoelectric element 162 has a structure in which a piezoelectric body is interposed between an upper electrode and a lower electrode. When a driving voltage is applied between the upper electrode and the lower electrode, flexural deformation occurs in the piezoelectric element and the pressure chamber 352 is deformed by the flexural deformation of the piezoelectric element. As a result, the ink stored in the pressure chamber 352 is discharged from the nozzle 350.

In addition, the inkjet head to which the thermal system is applied includes a heater that heats the ink stored in the pressure chamber (liquid chamber) 352, and momentarily heats the ink in the pressure chamber 352 to generate air bubbles, and discharges the ink from the nozzle 350.

<Description of Control System>

Figure 30:
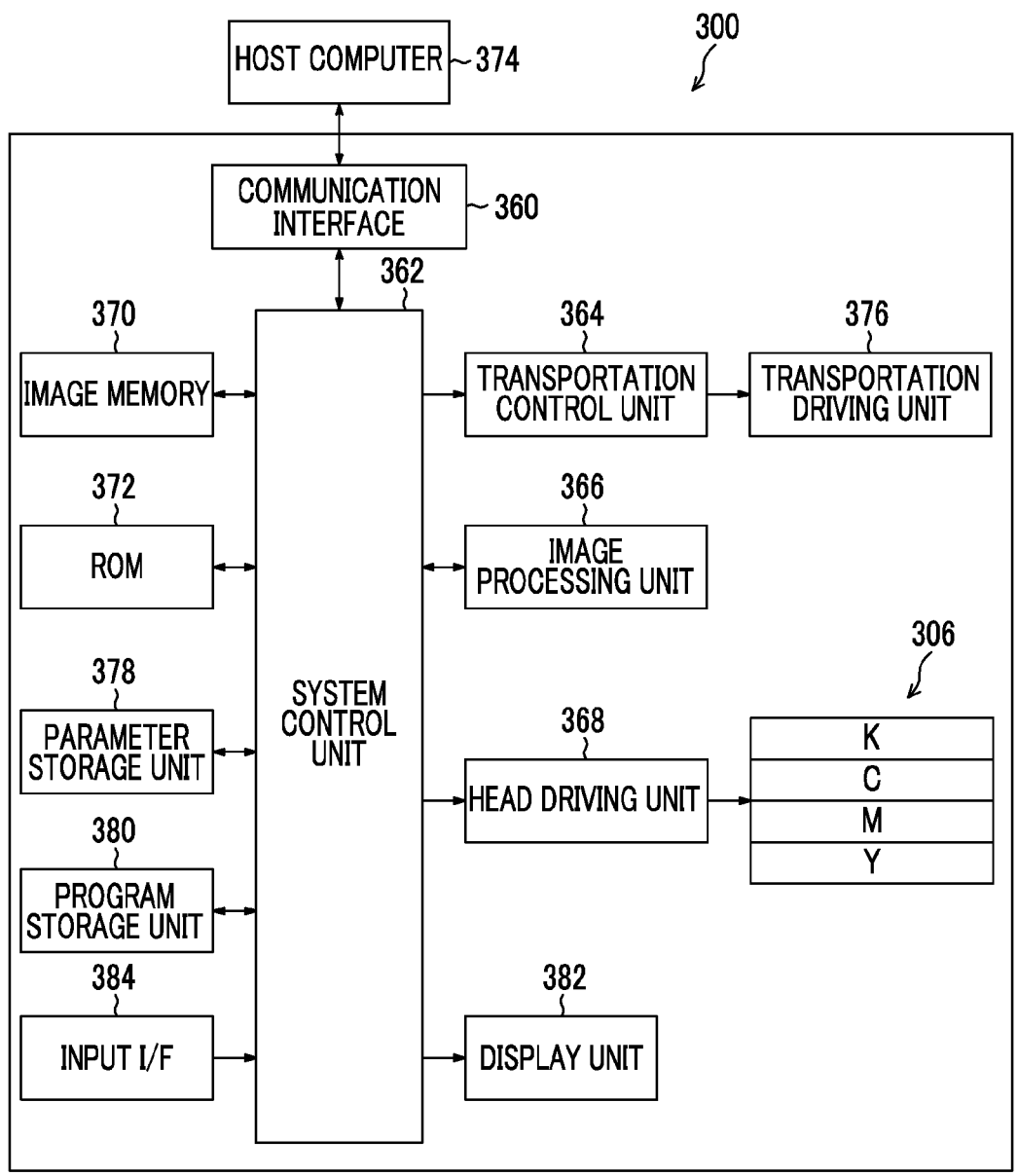
FIG. 30 is a block diagram illustrating a main portion of the system structure of an inkjet recording device.

FIG. 30 is a block diagram illustrating the schematic structure of a control system of the inkjet recording device 300. As illustrated in FIG. 30, the inkjet recording device 300 includes, for example, a communication interface 360, a system control unit 362, a transportation control unit 364, an image processing unit 366, a head driving unit 368, an image memory 370, and a ROM 372.

The communication interface 360 is an interface unit that receives image data transmitted from a host computer 374. The communication interface 360 may be a serial interface, such as a universal serial bus (SB) or a parallel interface, such as a Centronics interface. The communication interface 360 may be provided with a buffer memory (not illustrated) in order to increase a communication rate.

The system control unit 362 includes, for example, a central processing unit (CPU) and peripheral circuits, functions as a control device that controls the overall operation of the inkjet recording device 300 according to a predetermined program, and also functions as an arithmetic unit that performs various operations. In addition, the system control unit 362 functions as a memory controller for the image memory 370 and the ROM 372.

That is, the system control unit 362 controls each unit, such as the communication interface 360 and the transportation control unit 364, performs, for example, communication control with the host computer 374 and reading/writing control for the image memory 370 and the ROM 372, and generates control signals for controlling each of the above-mentioned units.

Image data (data for a recording image) transmitted from the host computer 374 is input to the inkjet recording device 300 through the communication interface 360. The image processing unit 366 performs predetermined image processing for the image data.

The image processing unit 366 is a control unit which has a signal (image) processing function of performing processes, such as various types of processing and correction for generating a printing control signal from the image data and supplies the generated printing data (dot data) to the head driving unit 368.

When the image processing unit 366 performs required signal processing, the amount of droplets (discharge amount) discharged from the inkjet head 306 or the discharge time of the droplets are controlled through the head driving unit 368 on the basis of the printing data (halftone image data).

In this way, a desired dot size or dot array is obtained. The head driving unit 368 may include a feedback control system for constantly maintaining the driving condition of the inkjet head 306.

The image processing unit 366 illustrated in FIG. 30 has the functions of the image processing device 10 described with reference to FIG. 25 or the image processing device 100 described with reference to FIG. 26. In addition, the control system of the inkjet recording device 300 illustrated in FIG. 30 can be appropriately shared by each structure illustrated in FIG. 26.

The transportation control unit 364 illustrated in FIG. 30 controls the transportation time and transportation speed of the recording medium on the basis of the printing data generated by the image processing unit 366. A transportation driving unit 376 includes a motor for driving the driving roller 310 (312) of the recording medium transportation unit 304 that transports the recording medium. The transportation control unit 364 functions as a driver for the motor.

The image memory (temporary storage memory) 370 has the function of temporary storage unit temporarily storing the image data which is input through the communication interface 360 and the function of a development area of various programs stored in the ROM 372 or an operation work area (for example, a work area of the image processing unit 366) of the CPU. A volatile memory (RAM) to and from which data can be sequentially read and written is used as the image memory 370.

The ROM 372 stores, for example, programs executed by the CPU of the system control unit 362 and various kinds of data and control parameters required to control each unit of the device. Data is read from and written to the ROM 372 through the system control unit 362. The ROM 372 is not limited to the memory including semiconductor elements and a magnetic medium, such as a hard disk, may be used. In addition, a detachable storage medium including an external interface may be used.

A parameter storage unit 378 stores various control parameters required for the operation of the inkjet recording device 300. The system control unit 362 appropriately reads parameters required for control and updates (rewrites) various parameters if necessary.

A program storage unit 380 is storage a unit storing a control program for operating the inkjet recording device 300. When performing control for each unit of the device, the system control unit 362 (or each unit of the device) reads a necessary control program from the program storage unit 380 and appropriately executes the control program.

A display unit 382 is a unit displaying various kinds of information transmitted from the system control unit 362. A general-purpose display device, such as a LCD monitor, is applied to the display unit 382. Here, the lighting (turn-on and turn-off) of a lamp may be applied to the display form of the display unit 382. In addition, the display unit 382 may include a sound (voice) output unit such as a speaker.

An information input unit, such as a keyboard, a mouse, or a joy stick, is applied to an input interface (I/F) 384. Information which is input through the input interface 384 is transmitted to the system control unit 362.

The transportation of the recording medium is not limited to the belt conveyance system and other transportation systems, such as a drum transportation system and a roller transportation system, can be applied.

<Other Examples of Structure of Device>

Figure 31:
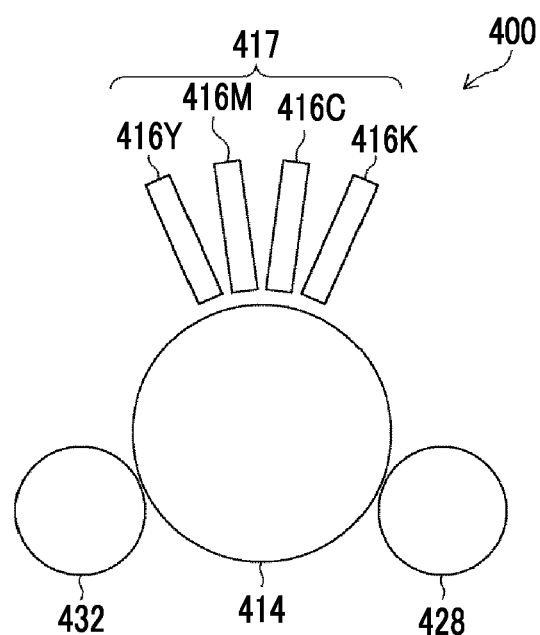
FIG. 31 is a diagram illustrating an example of the structure of a main portion of a drum-transportation-type inkjet recording device.
Figure 32:
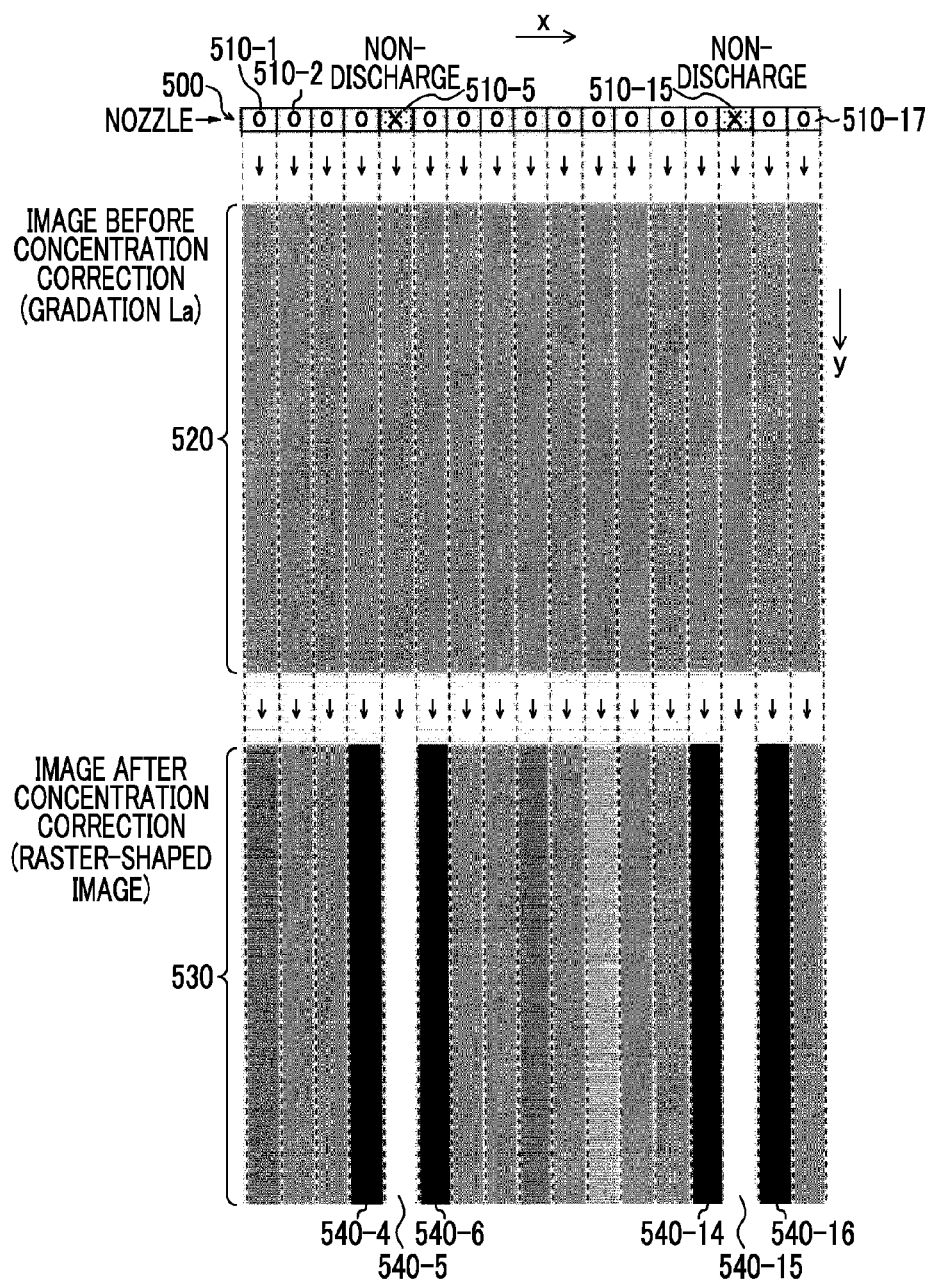
FIG. 32 is a conceptual diagram illustrating a concentration correction (unevenness correction) process.
Figure 33:
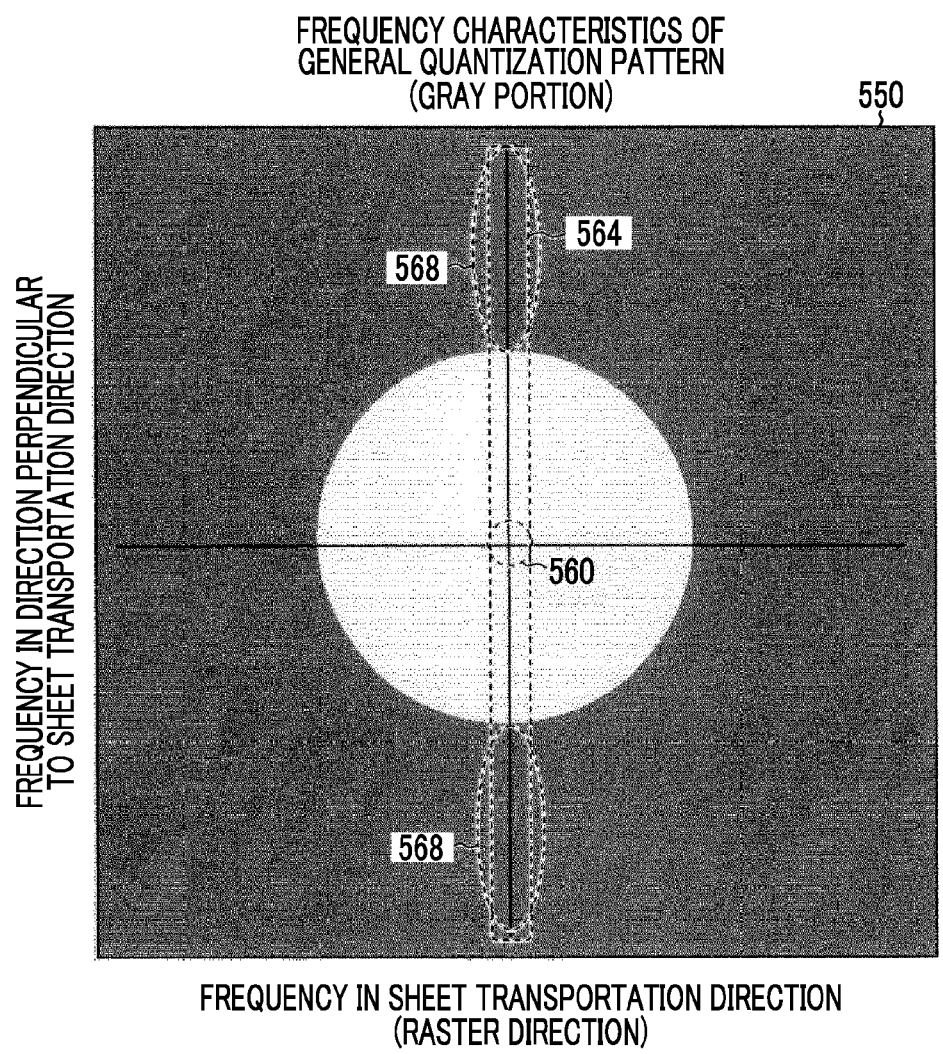
FIG. 33 is a diagram schematically illustrating frequency characteristics of a general quantization pattern.

FIG. 31 is a diagram schematically illustrating the entire structure of an inkjet recording device 400 in which the drum transportation system is applied to the transportation of the recording medium. The inkjet recording device 400 illustrated in FIG. 31 has a transportation system in which the recording medium is fixed to the outer peripheral surface of a drawing drum 414 (not illustrated in FIG. 31) and the drawing drum 414 is rotated to rotate and transport the recording medium along the outer peripheral surface of the drawing drum 414.

Inkjet heads 416K, 416C, 416M, and 416Y are arranged along the outer peripheral surface of the drawing drum 414 so as to be inclined with respect to the horizontal plane. The structure of the inkjet heads 306K, 306C, 306M, and 306Y illustrated in FIG. 29 can be applied to the inkjet heads 416K, 416C, 416M, and 416Y forming the printing unit 417.

The recording medium which is transported from a sheet feed unit (not illustrated) is held by a transfer cylinder 428 and is then transported to the drawing drum 414. The recording medium having the image formed by the printing unit 417 is transported from the drawing drum 414 to a transfer cylinder 432 which is provided in the stage after the drawing drum 414.

In the inkjet recording device 400 illustrated in FIG. 31, processes (for example, preprocessing for the recording medium) before the image forming process and processes (for example, a drying process and a fixing process) after the image forming process may be added.

The structure of the inkjet recording device described with reference to FIGS. 28 to 31 is an illustrative example. Structures can be appropriately added or the structure can be appropriately removed or changed.

<For Means for Moving Head and Sheet Relative to Each Other>

In the above-described embodiment, the recording medium is transported relative to the fixed recording head. However, in the invention, the recording head may be moved relative to a fixed recording medium. In general, the single-pass-type line heads are arranged in a direction perpendicular to the transfer direction (transportation direction) of the recording medium. However, the recording heads may be arranged in a direction that is inclined at a predetermined angle with respect to the direction perpendicular to the transportation direction.

<For Recording Medium>

The "recording medium" is the general term of a media on which dots are recorded by the recording head and includes various terms, such as a recording medium, a printing medium, a recorded medium, an image-formed medium, an image receiving medium, and a discharged medium. In the invention, for example, the material or shape of the recording medium is not particularly limited. Various media which are made of other materials or have other shapes may be used. For example, roll paper, cut paper, seal sheets, resin sheets, such as OHP sheets, films, cloth, non-woven fabrics, printed circuit boards on which a wiring pattern is formed, and rubber sheets can be used.

<Application Example of Device>

In the above-described embodiment, the present invention is applied to the inkjet recording device for graphic printing. However, the application range of the invention is not limited thereto. The invention can be widely applied to various inkjet devices that draw various forms and patterns using a functional liquid material, such as a wiring line drawing device that draws a wiring pattern of an electronic circuit, an apparatus that manufactures various devices, a resist recording device that uses a resin liquid as a functional liquid for discharge, a color filter manufacturing device, and a fine structure forming device that forms a fine structure using a deposition material.

<For Usage of Recording Heads Other than Inkjet Recording Head>

In the above-described embodiment, the inkjet recording device is given as an example of the image forming device using the recording head. However, the application range of the invention is not limited thereto. The invention can be applied to various types of image forming devices that record dots, such as a thermal transfer recording device including a recording head that has a thermal element as a recording element, an LED electrophotographic printer including a recording head that has an LED element as a recording element, and a silver halide photographic printer including an LED line exposure head, in addition to the inkjet type.

In the above-described embodiments of the invention, the components can be appropriately changed, added, and removed without departing from the scope and spirit of the invention. The invention is not limited to the above-described embodiments and it should be understood by those skilled in the art that various modifications and changes of the invention can be made in the technical scope of the invention.

What is claimed is:

1. An image processing method comprising:
   a defect information acquisition step of acquiring defective recording element information that is information of a defective recording element in a recording head in which a plurality of recording elements are arranged;
   a mask processing step of performing a mask process that makes the defective recording element unusable on the basis of the defective recording element information acquired in the defect information acquisition step;
   an image correction step of correcting image concentration of pixel rows, which are adjacent to a pixel row corresponding to the masked defective recording element, in input image data to reduce visibility of a streak-like image defect caused by the mask process; and
   a quantization processing step of quantizing the image data whose concentration has been corrected in the image correction step to convert the image data into binary or multi-valued image data with a smaller number of gradations than the concentration-corrected image data,
   wherein the quantization processing step includes:
   a first quantization step of applying a first quantization method to a first image region which includes the pixel row corresponding to the masked defective recording element and the pixel rows adjacent to the pixel row corresponding to the defective recording element to perform quantization; and
   a second quantization step of applying a second quantization method different from the first quantization method to a second image region other than the first image region to perform quantization, and
   for at least some gradations, a first quantization pattern which is obtained by quantization using the first quantization method has a first pattern characteristic in which a spatial frequency component in a first direction parallel to a moving direction of a recording medium relative to the recording head is suppressed with respect to all spatial frequency components in a second direction perpendicular to the first direction, as compared to a second quantization pattern which is obtained by quantization using the second quantization method.

2. The image processing method according to claim 1, wherein a common quantization pattern is obtained for a reference specific halftone by the first quantization method and the second quantization method, and
   in a second gradation region different from a first gradation region including the specific halftone, the second quantization method generates a quantization pattern indicating a second pattern characteristic different from the first pattern characteristic and the first quantization method generates a quantization pattern which maintains the first pattern characteristic, as compared to the second quantization method.

3. The image processing method according to claim 2, wherein the common quantization pattern has the first pattern characteristic.

4. The image processing method according to claim 2, wherein, in the quantization processing step, threshold matrices different for each the first image region and the second image region are applied to the first image region and the second image region to perform the quantization,
   a first threshold matrix which is applied to the first image region in the first quantization step and a second threshold matrix which is applied to the second image region in the second quantization step are generated on the basis of the common quantization pattern, and
   in the first threshold matrix, the first pattern characteristic is maintained at a larger number of gradations than that in the second threshold matrix.

5. The image processing method according to claim 4, wherein the quantization processing step further includes a step of diffusing a quantization error, which occurs due to quantization using the first threshold matrix or the second threshold matrix, to neighboring pixels that have not been quantized.

6. The image processing method according to claim 2, wherein the first quantization method and the second quantization method perform the quantization using the common threshold matrix,
   in the common threshold matrix, the first pattern characteristic is maintained in the first gradation region and the second gradation region,
   in the first image region, the quantization is performed with reference to the common threshold matrix in the first gradation region and the second gradation region, and
   in the second image region, the quantization is performed with reference to the common threshold matrix in the first gradation region and is performed in the second gradation region by an error diffusion method which uses, as a constraint condition of a dot array, the common quantization pattern or a threshold matrix pattern of gradations close to the common quantization pattern.

7. The image processing method according to claim 1, wherein, in the first pattern characteristic, a low-frequency component that is equal to or less than 10 cycles/mm among the spatial frequency components in the first direction is suppressed.

8. The image processing method according to claim 7, wherein, in the first pattern characteristic, a component has a minimum value in a region corresponding to the low-frequency component that is equal to or less than 10 cycles/mm among the spatial frequency components in the first direction, when a distribution of a spatial frequency spectrum obtained by two-dimensional Fourier transform is seen from a section line parallel to the first direction.

9. An image processing device comprising:
a processor configured to function as:
a defect information acquisition unit acquiring defective recording element information that is information of a defective recording element in a recording head in which a plurality of recording elements are arranged;
a mask processing unit performing a mask process that makes the defective recording element unusable on the basis of the defective recording element information acquired by the defect information acquisition unit;
an image correction unit correcting image concentration of pixel rows, which are adjacent to a pixel row corresponding to the masked defective recording element, in input image data to reduce visibility of a streak-like image defect caused by the mask process; and
a quantization processing unit quantizing the image data whose concentration has been corrected by the image correction unit to convert the image data into binary or multi-valued image data with a smaller number of gradations than the concentration-corrected image data,
wherein the quantization processing unit includes:
a first quantization unit applying a first quantization method to a first image region which includes the pixel row corresponding to the masked defective recording element and the pixel rows adjacent to the pixel row to perform quantization; and
a second quantization unit applying a second quantization method different from the first quantization method to a second image region other than the first image region to perform quantization, and
for at least some gradations, a first quantization pattern which is obtained by quantization using the first quantization method has a first pattern characteristic in which a spatial frequency component in a first direction parallel to a moving direction of a recording medium relative to the recording head is suppressed with respect to all spatial frequency components in a second direction perpendicular to the first direction, as compared to a second quantization pattern which is obtained by quantization using the second quantization method.

10. The image processing device according to claim 9,
wherein a common quantization pattern is obtained for a reference specific halftone by the first quantization method and the second quantization method, and
in a second gradation region different from a first gradation region including the specific halftone, the second quantization method generates a quantization pattern indicating a second pattern characteristic different from the first pattern characteristic and the first quantization method generates a quantization pattern which maintains the first pattern characteristic, as compared to the second quantization method.

11. The image processing device according to claim 10, wherein the common quantization pattern has the first pattern characteristic.

12. The image processing device according to claim 10,
wherein the quantization processing unit applies threshold matrices different for each the first image region and the second image region to the first image region and the second image region to perform the quantization,
the first quantization unit generates a first threshold matrix which is applied to the first image region on the basis of the common quantization pattern,
the second quantization unit generates a second threshold matrix which is applied to the second image region on the basis of the common quantization pattern, and
in the first threshold matrix, the first pattern characteristic is maintained at a larger number of gradations than that in the second threshold matrix.

13. The image processing device according to claim 12,
wherein the quantization processing unit diffuses a quantization error, which occurs due to quantization using the first threshold matrix or the second threshold matrix, to neighboring pixels that have not been quantized.

14. The image processing device according to claim 11,
wherein the first quantization method and the second quantization method perform the quantization using the common threshold matrix,
in the common threshold matrix, the first pattern characteristic is maintained in the first gradation region and the second gradation region,
in the first image region, the quantization processing unit performs the quantization with reference to the common threshold matrix in the first gradation region and the second gradation region, and
in the second image region, the quantization processing unit performs the quantization with reference to the common threshold matrix in the first gradation region and performs the quantization in the second gradation region using an error diffusion method which uses, as a constraint condition of a dot array, the common quantization pattern or a threshold matrix pattern of gradations close to the common quantization pattern.

15. A non-transitory computer readable medium storing a program, the program causing the computer to execute:
a defect information acquisition step of acquiring defective recording element information that is information of a defective recording element in a recording head in which a plurality of recording elements are arranged;
a mask processing step of performing a mask process that makes the defective recording element unusable on the basis of the defective recording element information acquired in the defect information acquisition step;
an image correction step of correcting image concentration of pixel rows, which are adjacent to a pixel row corresponding to the masked defective recording element, in input image data to reduce visibility of a streak-like image defect caused by the mask process; and
a quantization processing step of quantizing the image data whose concentration has been corrected in the image correction step to convert the image data into binary or multi-valued image data with a smaller number of gradations than the concentration-corrected image data,
wherein the quantization processing step includes:
a first quantization step of applying a first quantization method to a first image region which includes the pixel row corresponding to the masked defective recording element and the pixel rows adjacent to the pixel row to perform quantization; and
a second quantization step of applying a second quantization method different from the first quantization method to a second image region other than the first image region to perform quantization, and
for at least some gradations, a first quantization pattern which is obtained by quantization using the first quantization method has a first pattern characteristic in which a spatial frequency component in a first direction parallel to a moving direction of a recording medium relative to the recording head is suppressed with respect to all spatial frequency components in a second direction perpendicular to the first direction, as compared to a second quantization pattern which is obtained by quantization using the second quantization method.

16. An image forming device comprising:
a recording head in which a plurality of recording elements are arranged;
a processor configured to function as:
   a relatively moving unit moving a recording medium relative to the recording head;
   a defect information acquisition unit acquiring information of a defective recording element in the recording head;
   a mask processing unit performing a mask process that makes the defective recording element unusable on the basis of the defective recording element information acquired by the defect information acquisition unit;
   an image correction unit correcting image concentration of pixel rows, which are adjacent to a pixel row corresponding to the masked defective recording element, in input image data to reduce visibility of a streak-like image defect caused by the mask process; and
   a quantization processing unit quantizing the image data whose concentration has been corrected by the image correction unit to convert the image data into binary or multi-valued image data with a smaller number of gradations than the concentration-corrected image data; and
   a controller controlling a recording operation of the recording elements in the recording head on the basis of the binary or multi-valued image data generated by the quantization processing unit,
wherein the quantization processing unit includes:
   a first quantization unit applying a first quantization method to a first image region which includes the pixel row corresponding to the masked defective recording element and the pixel rows adjacent to the pixel row to perform quantization; and
   a second quantization unit applying a second quantization method different from the first quantization method to a second image region other than the first image region to perform quantization, and
   for at least some gradations, a first quantization pattern which is obtained by quantization using the first quantization method has a first pattern characteristic in which a spatial frequency component in a first direction parallel to a moving direction of a recording medium relative to the recording head is suppressed with respect to all spatial frequency components in a second direction perpendicular to the first direction, as compared to a second quantization pattern which is obtained by quantization using the second quantization method.

* * * * *